United States Patent
Tsuchida

(10) Patent No.: US 12,143,420 B2
(45) Date of Patent: Nov. 12, 2024

(54) SHUFFLING SHARES AMONG NODES TO DETECT INCORRECTNESS OR FRAUDS

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 245 days.

(21) Appl. No.: 17/778,111

(22) PCT Filed: Nov. 28, 2019

(86) PCT No.: PCT/JP2019/046509
§ 371 (c)(1),
(2) Date: May 19, 2022

(87) PCT Pub. No.: WO2021/106133
PCT Pub. Date: Jun. 3, 2021

(65) Prior Publication Data
US 2022/0368723 A1  Nov. 17, 2022

(51) Int. Cl.
*H04L 9/40* (2022.01)
(52) U.S. Cl.
CPC ...... *H04L 63/1483* (2013.01); *H04L 63/0869* (2013.01); *H04L 63/126* (2013.01)
(58) Field of Classification Search
CPC ............... H04L 63/0869; H04L 63/126; H04L 63/1483
USPC .......................................................... 726/22
See application file for complete search history.

(56) References Cited

U.S. PATENT DOCUMENTS

| 10,867,018 | B2 * | 12/2020 | Ikarashi ................. H04L 9/085 |
| 2003/0046547 | A1 | 3/2003 | Jakobsson et al. |
| 2010/0002695 | A1 * | 1/2010 | Cheung ................. H04L 65/611 370/390 |
| 2010/0106964 | A1 | 4/2010 | Hirata et al. |

(Continued)

FOREIGN PATENT DOCUMENTS

| JP | 2009-122731 A | 6/2009 |
| JP | 2010-039890 A | 2/2010 |

(Continued)

OTHER PUBLICATIONS

JP Office Action for JP Application No. 2021-561063, mailed on Jul. 18, 2023 with English Translation.

(Continued)

*Primary Examiner* — David P Zarka

(57) ABSTRACT

Among four secure computation nodes, one secure computation node is selected as a receiving node. Two of three remaining secure computation nodes among the four secure computation nodes are operated as resharing nodes, and a remaining secure computation node is operated as a verifying node. The resharing node(s) performs a mini-shuffle for resharing share(s) held therein by using a permutation that the receiving node does not know and transmits a result(s) of the mini-shuffle to the receiving node. The verifying node computes data to verify the result(s) of the mini-shuffle performed by the resharing node(s) by using a permutation that the receiving node does not know and transmits the data to the receiving node. Shuffling of shares is achieved by repeatedly performing a round as described above so that each of the four secure computation nodes is selected as the receiving node at least once.

18 Claims, 17 Drawing Sheets

(56) References Cited

U.S. PATENT DOCUMENTS

| | | | |
|---|---|---|---|
| 2011/0135088 A1* | 6/2011 | Rudland | H04L 9/0841 380/46 |
| 2012/0036187 A1* | 2/2012 | Luboshitz | H04L 67/104 709/204 |
| 2013/0182836 A1* | 7/2013 | Hamada | H04L 9/0891 380/28 |
| 2016/0335924 A1* | 11/2016 | Ikarashi | G09C 1/00 |
| 2017/0353311 A1* | 12/2017 | Schukai | H04L 9/3231 |
| 2018/0205707 A1* | 7/2018 | Bellala | H04L 9/085 |
| 2019/0266326 A1 | 8/2019 | Furukawa | |
| 2020/0059351 A1* | 2/2020 | Atallah | H04L 9/008 |
| 2021/0135849 A1 | 5/2021 | Ikarashi et al. | |
| 2022/0060319 A1* | 2/2022 | Patel | H04L 9/085 |
| 2022/0399991 A1* | 12/2022 | Tsuchida | H04L 9/085 |
| 2023/0006846 A1* | 1/2023 | Zhu | H04L 63/123 |
| 2023/0403143 A1* | 12/2023 | Tsuchida | G06F 21/57 |
| 2024/0106654 A1* | 3/2024 | Tsuchida | G09C 1/00 |

FOREIGN PATENT DOCUMENTS

| | | |
|---|---|---|
| JP | 2012-154990 A | 8/2012 |
| JP | 2013-200461 A | 10/2013 |
| JP | 2017-040851 A | 2/2017 |
| JP | 2017-129913 A | 7/2017 |
| WO | 2012/046692 A1 | 4/2012 |
| WO | 2015/107952 A1 | 7/2015 |
| WO | 2018/061391 A1 | 4/2018 |
| WO | 2019/039380 A1 | 2/2019 |

OTHER PUBLICATIONS

International Search Report for PCT Application No. PCT/JP2019/046509, mailed on Feb. 10, 2020.

Ikarashi Dai, et al., "A Design and an Implementation of Super-high-speed Multi-party Sorting: The Day When Multi-party Computation Reaches Scripting Languages", Computer Security Symposium 2017, proceedings Feb. 2017 (2017).

Sven Laur, Jan Willemson, and Bingsheng Zhang, "Round-efficient oblivious database manipulation", International Conference on Information Security, Springer, Berlin, Heidelberg, 2011, [searched on Nov. 1, 2019], Internet <URL:https://eprint.iacr.org/2011/429.pdf>.

Chida, Koji et al., "Efficient 3-Party Secure Funciton Evaluation and Its Applicaiton". IPSJ SIG Technical Report (CSEC), Apr. 15, 2010, pp. 1-7.

Tsujishita, Kentaro, Iwamura, Keiichi,, "Application of password protected secret sharing scheme to searchable encryption", IEICE Technical Report, May 18, 2017, vol. 117, No. 55, pp. 99-106.

* cited by examiner

SHUFFLING SHARES AMONG NODES TO DETECT INCORRECTNESS OR FRAUDS

This application is a National Stage Entry of PCT/JP2019/046509 filed on Nov. 28, 2019, the contents of all of which are incorporated herein by reference, in their entirety.

FIELD

The present invention relates to a shuffle system, a shuffle method, and a program.

BACKGROUND

Patent Literature (PTL) 1 discloses a secure computation method that achieves secure computation including secret random permutations at high-speed. In addition, as an application of such secure computation, there is database processing in which data and queries are kept secret. In addition, a sorting protocol is used as an important sub-protocol to realize database operations on the secure computation. PTL2 discloses a sorting algorithm that is not based on comparison.

There are several methods for realizing the above sorting protocol. Two typical schemes are as follows.

A scheme based on a sorting network

A scheme using shuffling (random permutations)

The scheme using shuffling needs less cost, and PTLs 1 and 2 both adopt this scheme. Two typical examples of the scheme using shuffling (random permutations) are as follows.

- A semi-honest security scheme using three-party (ring) replicated secret sharing (see Non Patent Literature (NPL) 1)
- A semi-honest security/malicious security scheme using N-party (field) additive secret sharing (see NPL2)
- PTL1: International Publication No. 2015/107952
- PTL2: Japanese Unexamined Patent Application No. 2012-154990
- NPL1: IKARASHI Dai, et al., "A Design and an Implementation of Super-high-speed Multi-party Sorting: The Day When Multi-party Computation Reaches Scripting Languages", Computer Security Symposium 2017, proceedings 2017.2 (2017)
- NPL2: Sven Laur, Jan Willemson, and Bingsheng Zhang, "Round-efficient oblivious database manipulation", International Conference on Information Security, Springer, Berlin, Heidelberg, 2011, [searched on Nov. 1, 2019], Internet <URL:eprint.iacr.org/2011/429.pdf>

SUMMARY

The following analysis has been made by the present inventor. In accordance with the scheme in the above NPL2, incorrectness or frauds can be detected stochastically by using commitment and zero-knowledge proof. However, even with the scheme in NPL2, incorrectness or frauds cannot be detected determinately.

It is an object of the present invention to provide a shuffle system, a shuffle method, and a program capable of determinately detecting incorrectness or frauds.

According to a first aspect, there is provided a shuffle system that achieves shuffling of shares by repeatedly performing a round so that each of four secure computation nodes is selected as a receiving node at least once. The round includes processes of selecting one of the four secure computation nodes as a receiving node and causing two of three remaining secure computation nodes among the four secure computation nodes to operate as resharing nodes and a remaining secure computation node to operate as a verifying node. In the round, the resharing node(s) performs a mini-shuffle for resharing share(s) held therein by using a permutation that the receiving node does not know and transmits a result(s) of the mini-shuffle to the receiving node, and the verifying node computes data to verify the result(s) of the mini-shuffle performed by the resharing node(s) by using a permutation that the receiving node does not know and transmits the data to the receiving node.

According to a second aspect, there is provided a shuffle method for shuffling shares, including repeatedly performing a round so that each of four secure computation nodes is selected as a receiving node at least once. The round includes, selecting one of the four secure computation nodes as a receiving node, and causing two of three remaining secure computation nodes among the four secure computation nodes to operate as resharing nodes and a remaining secure computation node to operate as a verifying node. In the rounds, the resharing node(s) performs a mini-shuffle for resharing share(s) held therein by using a permutation that the receiving node does not know and transmits a result(s) of the mini-shuffle to the receiving node, and the verifying node computes data to verify the result(s) of the mini-shuffle performed by the resharing node(s) by using a permutation that the receiving node does not know and transmits the data to the receiving node. The present method is associated with certain machines referred to as the secure computation nodes configured by the four secure computation nodes.

According to a third aspect, there is provided a (computer) program for realizing the functions of the above secure computation nodes. This program can be inputted to a computer apparatus via an input device or a communication interface from the outside, be stored in a storage device, cause a processor to drive in accordance with predetermined steps or processing, and display, as needed, a processing result including an intermediate state per stage on a display device or communicate with the outside via the communication interface. For example, the computer apparatus for this purpose typically includes a processor, a storage device, an input device, a communication interface, and a display device as needed, which can be connected to each other via a bus. In addition, this program can be recorded in a computer-readable (non-transitory) storage medium.

The present invention provides a shuffle system, a shuffle method, and a program capable of determinately detecting incorrectness or frauds.

PREFERRED MODES

Figure 1:
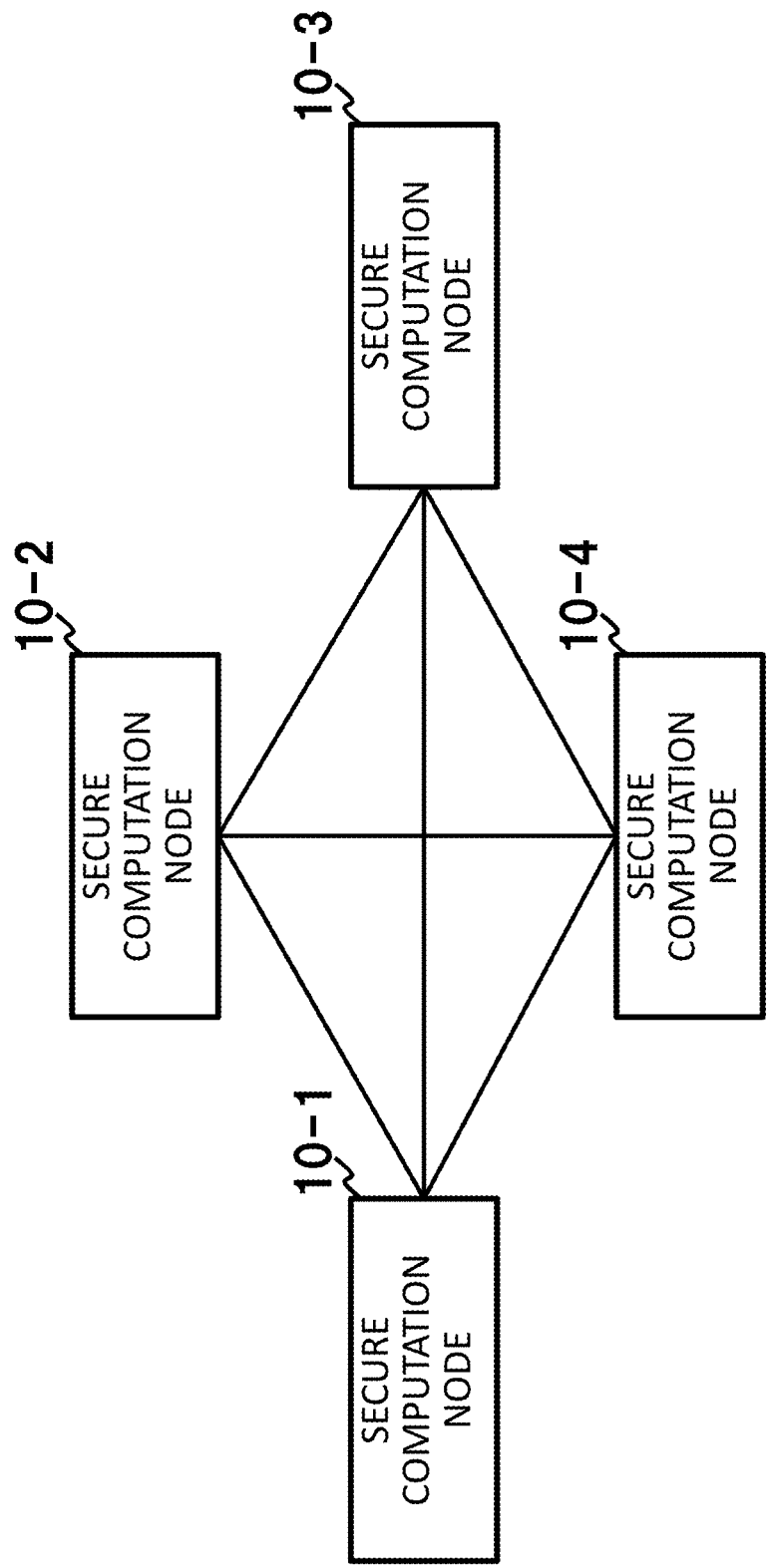
FIG. 1 is a diagram illustrating a configuration according to an example embodiment of the present invention.

First, an outline of an example embodiment of the present invention will be described with reference to drawings. In the following outline, various components are denoted by reference characters for the sake of convenience. That is, the following reference characters are merely used as examples to facilitate understanding of the present invention. Thus, the description of the outline is not meant to limit the present invention to the illustrated modes. An individual connection line between blocks in the drawings, etc. referred to in the following description signifies both one-way and two-way directions. An arrow schematically illustrates a principal signal (data) flow and does not exclude bidirectionality. A program is executed on a computer apparatus, and the computer apparatus includes, for example, a processor, a storage device, an input device, a communication interface, and as needed, a display device. In addition, this computer apparatus is configured such that the computer apparatus can communicate with its internal device or an external device (including a computer) via the communication interface in a wired or wireless manner. In addition, while a port or an interface is present at an input/output connection point of an individual block in the relevant drawings, illustration of the port or the interface is omitted. In addition, in the following description, "A and/or B" signifies A or B, or A and B.

An example embodiment of the present invention can be realized by a shuffle system including four secure computation nodes 10-1 to 10-4, as illustrated in FIG. 1. More concretely, one of the four secure computation nodes 10-1 to 10-4 is selected as a receiving node, and two of the three remaining secure computation nodes are operated as resharing nodes. The remaining secure computation node is operated as a verifying node.

Figure 2:
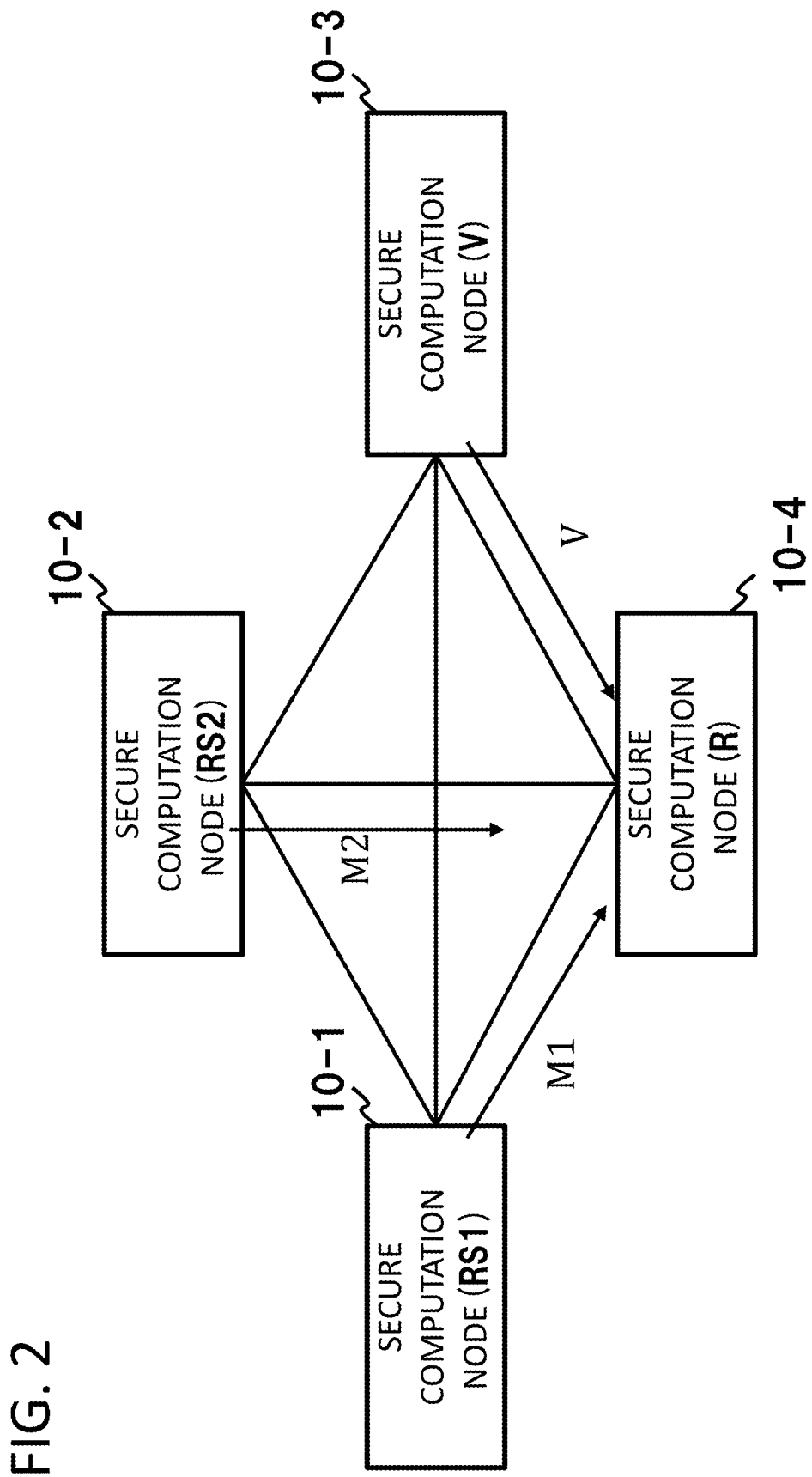
FIG. 2 is a diagram illustrating an operation according to the example embodiment of the present invention.

For example, as illustrated in FIG. 2, if the secure computation node 10-4 is selected as a receiving node (R), the secure computation nodes 10-1 and 10-2 may operate as resharing nodes (RS1) and (RS2) and the secure computation node 10-3 may operate as a verifying node (V).

Each of the secure computation nodes 10-1 and 10-2 operating as the resharing nodes (RS1) performs a mini-shuffle for resharing its shares held therein by using a permutation that the secure computation node 10-4 operating as the receiving node does not know. Next, the secure computation nodes 10-1 and 10-2 transmit their respective results M1 and M2 of the mini-shuffle to the secure computation node 10-4 operating as the receiving node. The secure computation node 10-3 operating as the verifying node (V) computes data V for verifying the results M1 and M2 of the mini-shuffle performed by the secure computation nodes 10-1 and 10-2 by using the permutation that the secure computation node 10-4 operating as the receiving node does not know. The secure computation node 10-3 transmits the data V for verifying the results M1 and M2 of the mini-shuffle performed by the secure computation nodes 10-1 and 10-2 to the secure computation node 10-4. Next, the secure computation node 10-4 determines whether or not the secure computation nodes 10-1 and 10-2 have performed the mini-shuffle correctly by using the data V for verifying the results M1 and M2 of the mini-shuffle.

Figure 3:
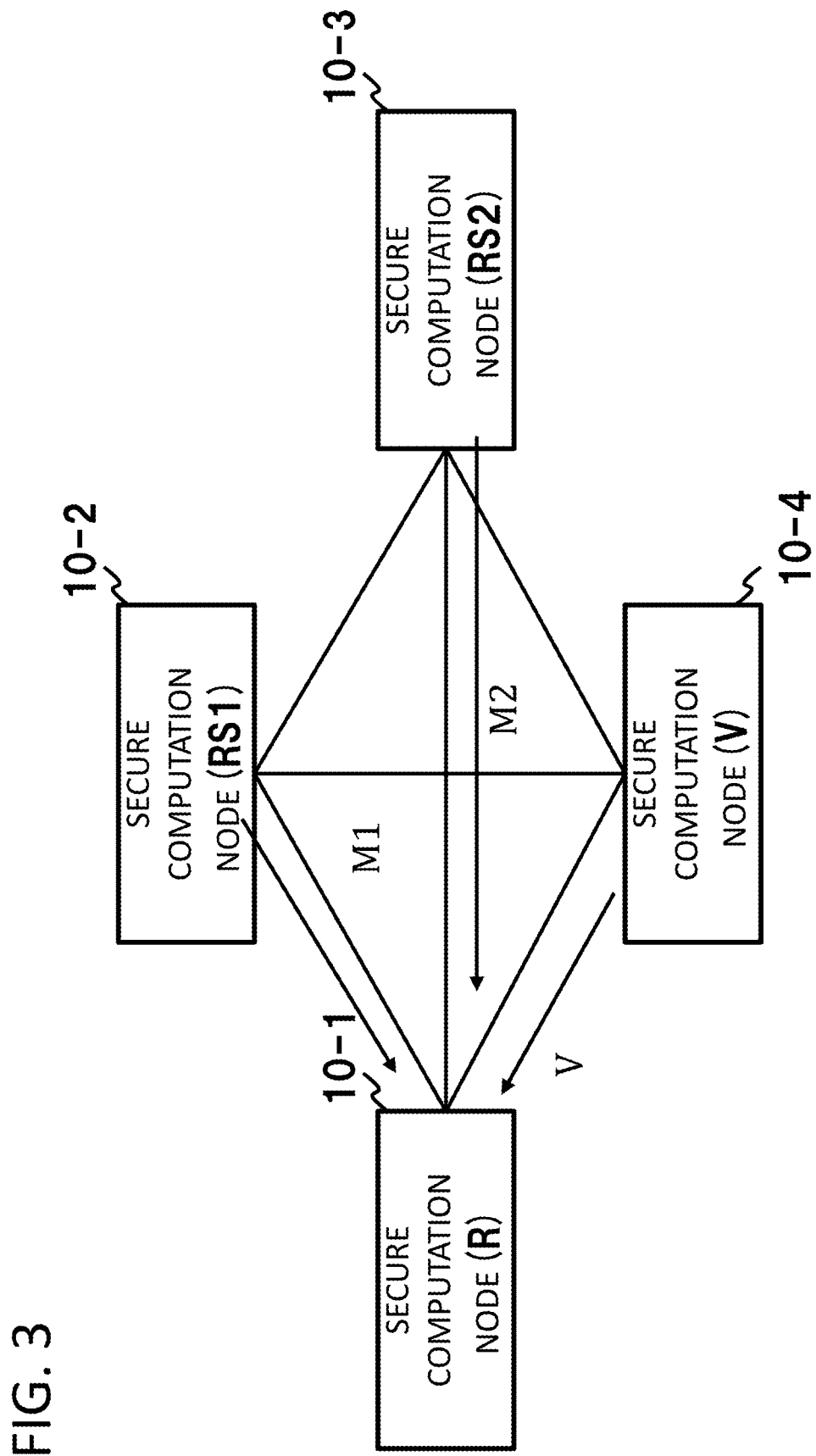
FIG. 3 is a diagram illustrating an operation according to the example embodiment of the present invention.

The above procedure is considered as 1 round. FIG. 3 illustrates a round in which the secure computation node 10-1 is selected as the receiving node (R), the secure computation nodes 10-2 and 10-3 operate as the resharing nodes (RS1) and (RS2), and the secure computation node 10-4 operates as the verifying node (V). In this case as well, the secure computation nodes 10-2 and 10-3 perform a mini-shuffle and transmit results M1 and M2 of the mini-shuffle to the secure computation node 10-1. The secure computation node 10-4 transmits data V for verifying the results M1 and M2 of the mini-shuffle to the secure computation node 10-1. Next, the secure computation node 10-1 determines whether or not the secure computation nodes 10-2 and 10-3 have performed the mini-shuffle correctly by using the data V.

As described above, the shares can be shuffled by repeatedly performing rounds such that the individual secure computation node is selected as the receiving node at least once. In addition, as described above, in an individual round, the receiving node (R) determines whether or not the corresponding mini-shuffle has correctly been performed by using the data created by the verifying node (V), and in this way, the receiving node (R) can determinately detect a incorrectness or fraud (hereinafter, "incorrectness or fraud" is represented by "fraud").

First Example Embodiment

Figure 4:
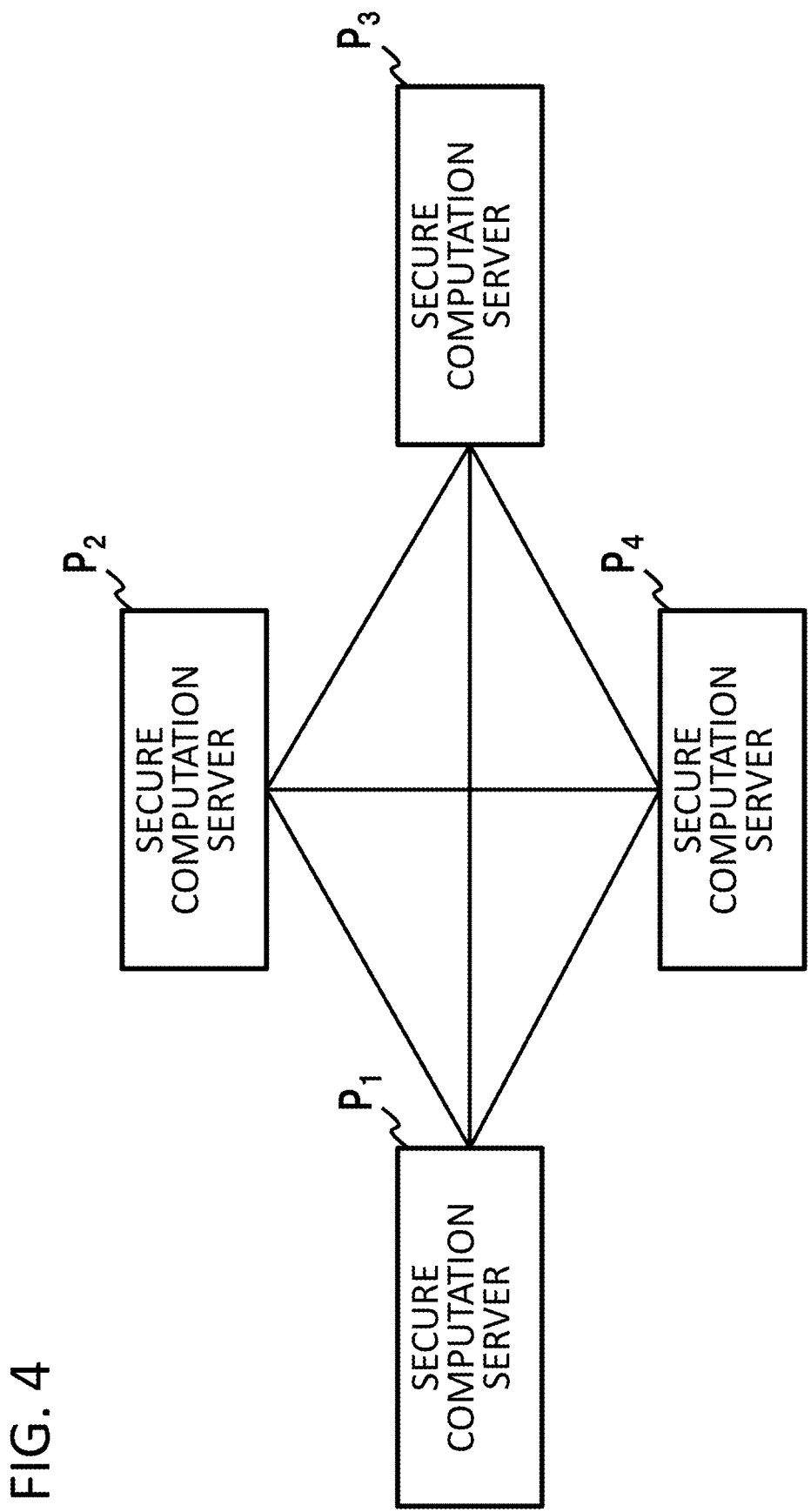
FIG. 4 is a diagram illustrating a configuration of a shuffle system according to a first example embodiment of the present invention.

Next, a first example embodiment of the present invention will be described in detail with reference to drawings. FIG. 4 is a diagram illustrating a configuration of a shuffle system according to the first example embodiment of the present invention. FIG. 4 illustrates a configuration in which four secure computation servers $P_1$ to $P_4$, which function as the above secure computation nodes, are connected to each other. Unless a particular secure computation server is specified, any one of the secure computation servers will also be referred to as a secure computation server $P_i$.

Hereinafter, the notation used in the following description will be defined. The fourth line in the following [Math. 1] describes a finite ring, and the fifth line in the following [Math. 1] describes a pseudorandom function. $S_m$ represents a set of permutations with m elements, and π represents an arbitrary permutation belonging to $S_m$. Among the permutation set $S_m$ with the m elements, $[\pi]_i$ represents a permutation that only $P_i$, $P_{i+1}$, and $P_{i+2}$ know.

[Math. 1]

The i-th party; $P_i$ (i=1, 2, 3, 4)
Security parameter: κ
The i-th seed: $seed_i \in \{0, 1\}^\kappa$
A finite ring: $\mathbb{R}$ s.t. $|\mathbb{R}|$ is k-bits and its order is R.
A pseudorandom function: $H: \{0,2\}^\kappa \times \{0,1\}^\kappa \to \{0,1\}^k$
The vector of shares: $[\vec{x}]^m = [x_1], \ldots, [x_m])$
All permutations of a set with m elements: $S_m$
A permutation of a set with m elements: $\pi \in S_m$
Only $P_i$, $P_{i+1}$ and $P_{i+2}$ know a permutation π: $[\pi]_i$ Hereinafter, the vector of an arbitrary element x will be expressed not only by an arrow over the element x but also by [vec{x}]. For example, an m dimensional vector of the shares of x in the above [Math. 1] will also be expressed by $[vec\{x\}]^m$.

Figure 5:
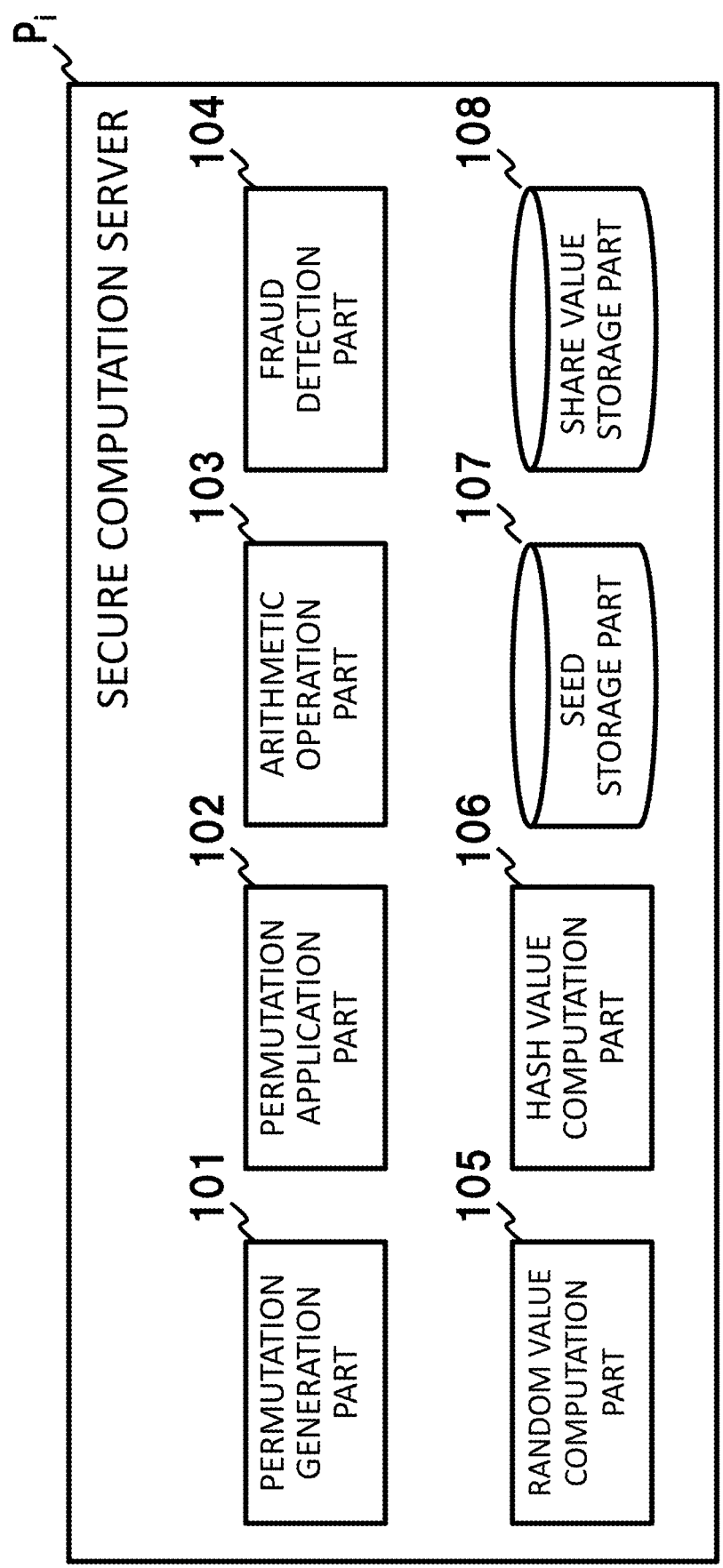
FIG. 5 is a diagram illustrating a configuration of a secure computation server according to the first example embodiment of the present invention.

FIG. 5 is a diagram illustrating a configuration of the secure computation server according to the first example embodiment of the present invention. FIG. 5 illustrates a configuration including a permutation generation part 101, a permutation application part 102, an arithmetic operation part 103, a fraud detection part 104, a random value computation part 105, a hash value computation part 106, a seed storage part 107, and a share value storage part 108.

The permutation generation part 101 generates a permutation $[\pi]_i$ that only $P_i$, $P_{i+1}$, and $P_{i+2}$ know, in coordination with other secure computation servers $P_i$. For example, the following description assumes that the secure computation server $P_1$ does not hold information about $[\pi]_2$ while the secure computation server $P_1$ holds $[\pi]_1$, $[\pi]_3$, and $[\pi]_4$.

The permutation application part 102 receives the m dimensional vector $[vec\{x\}]^m$ of the shares of the above x and the permutation $[\pi]_i$ and outputs $[vec\{y\}]^m$ by permutating $[vec\{x\}]^m$. A concrete example of processing of the permutation application part 102 will be described below along with an operation according to the present example embodiment.

The arithmetic operation part 103 performs computation of the m dimensional vector $[vec\{x\}]^m$ of the shares of the above x and random values computed by the random value computation part 105, for example. A concrete example of processing of the arithmetic operation part 103 will be described below along with an operation according to the present example embodiment.

When the secure computation server $P_i$ operates as a receiving node, the fraud detection part 104 determines whether or not other secure computation servers have performed a permutation correctly by using verification data transmitted from a verifying node. If the fraud detection part 104 determines that these secure computation servers have not performed a permutation correctly, the fraud detection part 104 determines to abort the processing.

The random value computation part 105 generates two random values by using a seed held in the seed storage part 107 and transmits the random values to the hash value computation part 106.

The hash value computation part 106 computes hash values of the random values computed by the random value computation part 105. According to the present example embodiment, these hash values are used as random values.

The seed storage part 107 stores the seeds used for generating random values as describe above. The present example embodiment assumes that the seeds have previously been distributed to the secure computation servers $P_1$ to $P_4$ as follows.

$P_1$: ($seed_1$, $seed_2$, $seed_4$)
$P_2$: ($seed_2$, $seed_3$, $seed_4$)
$P_3$: ($seed_3$, $seed_1$, $seed_4$)
$P_4$: ($seed_1$, $seed_2$, $seed_3$)

The share value storage part 108 holds the m dimensional vector of shares as the permutation target. The following description will be made assuming that the individual secure computation servers $P_1$ to $P_4$ hold shares of x, based on a 2-out-of-4 secret sharing scheme, as will be described below. Herein, x represents the elements of a finite ring R, and $x_1$, $x_2$, and $x_3$ are randomly generated such that $x_1+x_2+x_3$ satisfies x(mod R). Hereinafter, the shares of x will be denoted by [x], and the shares held by the secure computation server $P_i$ will be denoted by [x]i.

$P_1$: $[x]_1=(x_1,x_2)$ $P_2$: $[x]_2=(x_2,x_3)$ $P_3$: $[x]_3=(x_3,x_1)$ $P_4$: $[x]_4=(x_1-x_2,x_2-x_3)$

Next, an operation according to the present example embodiment will be described in detail with reference to drawings. According to the present example embodiment, a mini-shuffle round in which one of the secure computation servers $P_1$ to $P_4$ operates as the receiving node, two of the three remaining secure computation servers operate as resharing nodes, and the remaining secure computation server operates as the verifying node is repeated at least four times, to shuffle the m dimensional vector $[vec\{x\}]^m$ of the shares of x. In each round, if the fraud detection part 104 does not detect a fraud, the shuffle is deemed to be successful. If the fraud detection part 104 detects a fraud in any one of the rounds, the processing is aborted.

Figure 6:
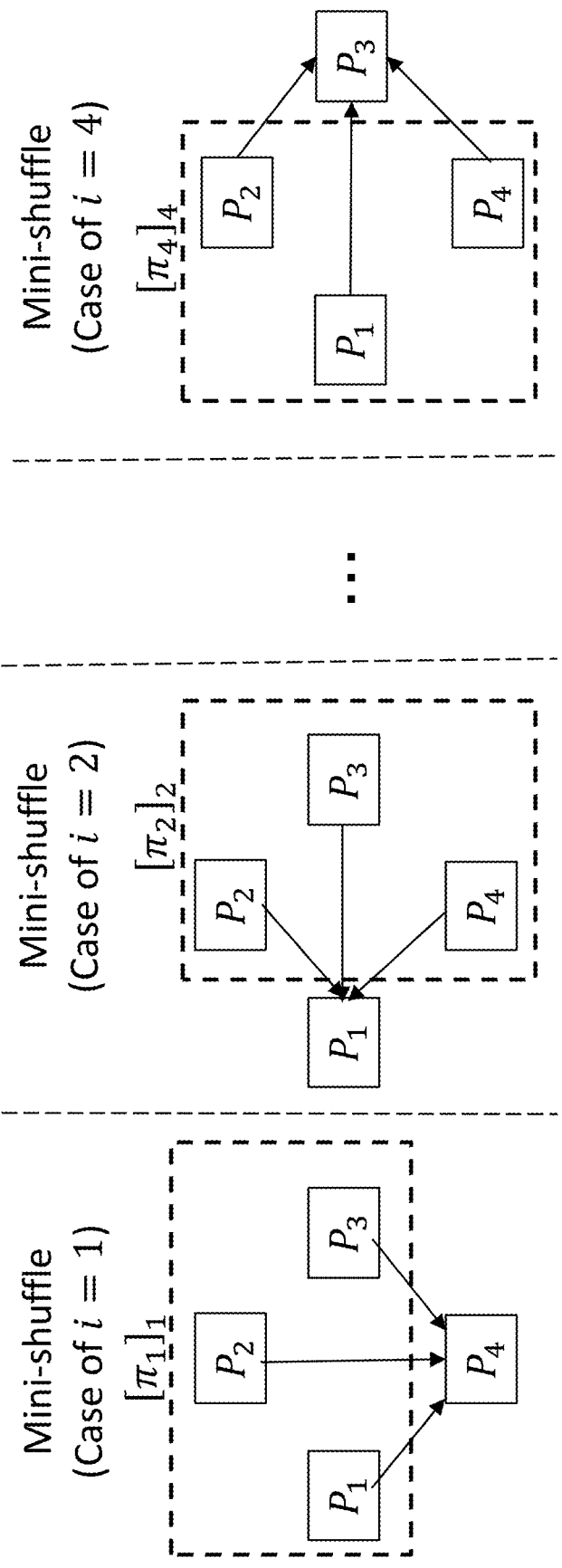
FIG. 6 is a diagram illustrating an example of a mini-shuffle execution order according to the first example embodiment of the present invention.

FIG. 6 is a diagram illustrating an example of a mini-shuffle execution order according to the first example embodiment of the present invention. As illustrated in FIG. 6, first, in case of i=1, $P_4$, which is $P_{i+3}$, is selected to operate as the receiving node. Next, a mini-shuffle is performed by causing $P_1$ to $P_3$, which are $P_i$, $P_{i+1}$, and $P_{i+2}$, to operate as the resharing nodes and the verifying node. Next, i is incremented, the round is performed in the same manner until i=4. A shuffle is consequently completed.

Next, details of the processing performed in the individual round will be described in order.

[Round 1 i=1]

Figure 7:
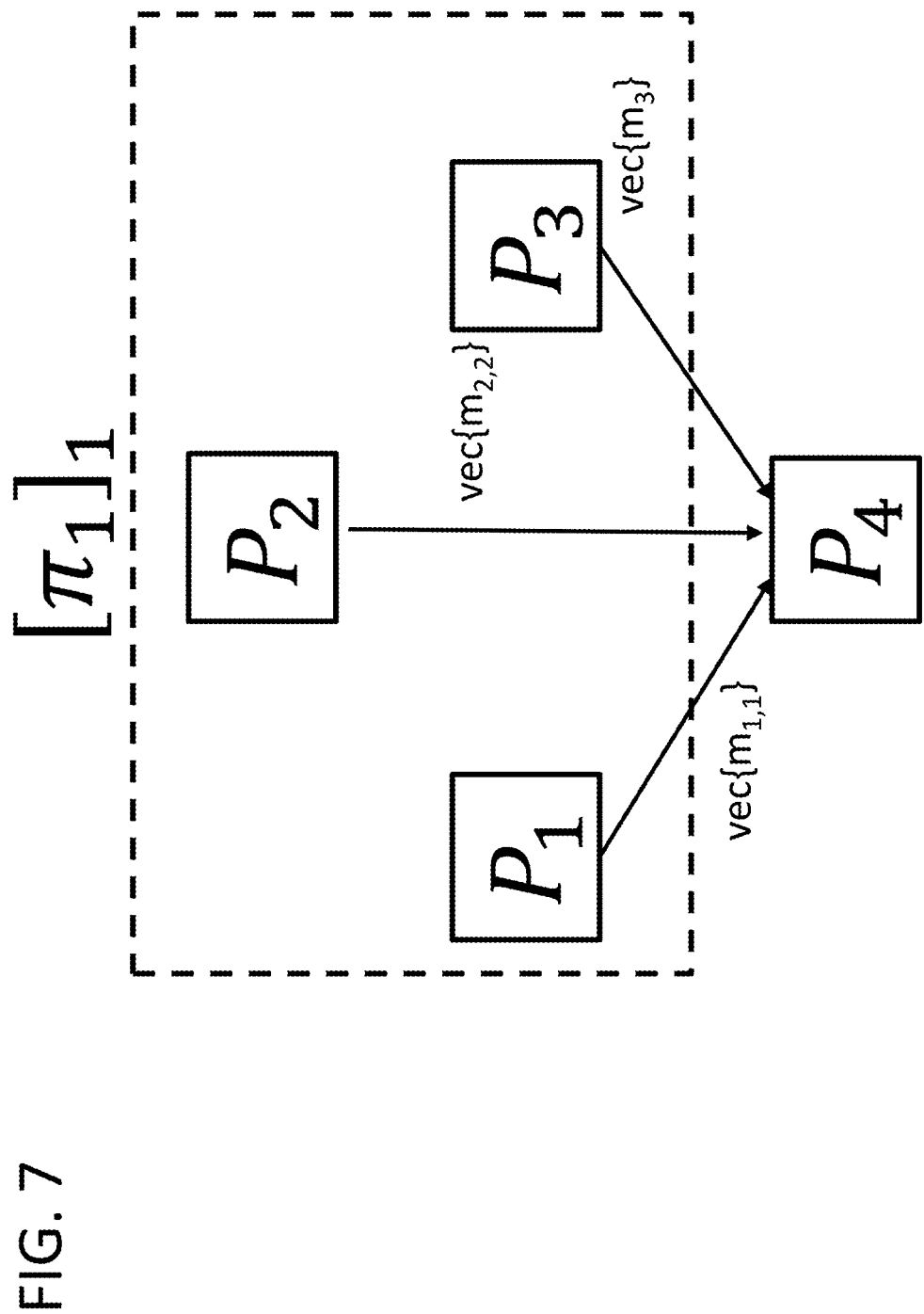
FIG. 7 is a diagram illustrating an operation in a round (i=1) according to the first example embodiment of the present invention.

FIG. 7 is a diagram illustrating an operation in a round (i=1). In round 1, the secure computation server $P_4$ operates as the receiving node. In addition, the secure computation servers $P_1$ and $P_2$ operate as the resharing nodes, and the secure computation server $P_3$ operates as the verifying node. The mini-shuffle in round 1 is expressed by the following expression [Math. 2].

$$[\vec{y}]^m \leftarrow \text{MiniShuffle}(1, [\vec{x}]^m, [\pi_1]_1) \quad \text{[Math. 2]}$$

[vec{x}]$^m$ on the right-hand side represents the m dimensional vector in which the shares of x are secret-shared and is expressed by $[x_1], \ldots, [x_m]$. In practice, as described above, $x_j$ is secret-shared in the secure computation server $P_i$ such that $x_j = x_{j,1} + x_{j,2} + x_{j,3}$ (j=1, ..., m) is satisfied. $[\pi]_1$ on the right-hand side is a permutation $[\pi]_i$ that only the secure computation servers $P_1$, $P_2$, $P_3$ know.

An output [vec{y}]$^m$ obtained from the above right-hand side content as the input is a result of a single mini-shuffle using the permutation $[\pi]_1$ and is expressed by $[y_{\pi1(1)}], \ldots, [y_{\pi1(m)}]$. $y_{\pi1(j)}$ in this output is also shared and held in the secure computation server $P_i$ such that $y_{\pi1(j)} = y_{\pi1(j),1} + y_{\pi1(j),2} + y_{\pi1(j),3}$ (j=1, ..., m) is satisfied, as described above.

The following expression [Math. 3] illustrates the above mini-shuffle procedure.

[Math. 3]

1. $P_1$, $P_2$, and $P_3$ generate the random values $r_{j,1}$ and $r_{j,2}$.

$r_{j,1} = H(vid_1 \| 1 \| j, seed_4)$ $r_{j,2} = H(vid_1 \| 2 \| j, seed_4)$

2. We set $y_{\pi_1(j)} = y_{\pi_1(j),1} + y_{\pi_1(j),2} + y_{\pi_1(j),3}$.

2-1. $P_1$ computes $y_{\pi_1(j),1}$ and $y_{\pi_1(j),2}$ as follows.

$y_{\pi_1(j),1} = x_{\pi_1(j),1} - r_{j,1}$ $y_{\pi_1(j),2} = x_{\pi_1(j),2} + r_{j,1} + r_{j,2}$ 2-2. $P_2$ computes $y_{\pi_1(j),2}$ and $y_{\pi_1(j),3}$ as follows.

$y_{\pi_1(j),2} = x_{\pi_1(j),2} + r_{j,1} + r_{j,2}$ $y_{\pi_1(j),3} = x_{\pi_1(j),3} - r_{j,2}$ 2-3. $P_3$ computes $y_{\pi_1(j),3}$ and $y_{\pi_1(j),1}$ as follows.

$y_{\pi_1(j),3} = x_{\pi_1(j),3} - r_{j,2}$ $y_{\pi_1(j),1} = x_{\pi_1(j),1} - r_{j,1}$

3. $P_1$ sends $\vec{m}_{1,1} = \vec{y}_1 - \vec{y}_2$ to $P_4$.

$P_2$ sends $\vec{m}_{2,2} = \vec{y}_2 - \vec{y}_3$ to $P_4$.

$P_3$ sends $\vec{m}_3 = \vec{y}_1 - \vec{y}_3$ to $P_4$.

$\vec{y}_l = (y_{\pi_1(1),l}, \ldots, y_{\pi_1(m),l})$

4. $P_4$ checks whether $\vec{m}_3 = \vec{m}_{1,1} + \vec{m}_{2,2}$ or not.

If it holds, then $P_4$ outputs continue.

If it does not hold, then $P_4$ outputs abort.

(Step 1-1) First, the secure computation servers $P_1$, $P_2$, and $P_3$ generate two random values $r_{j,1}$ and $r_{j,2}$ by using the seed, seed$_4$ that the secure computation server $P_4$ operating as the receiving node does not know.

(Steps 1-2-1 to 1-2-3) Next, the secure computation servers $P_1$, $P_2$, and $P_3$ compute $y_{\pi1(j),1}$, $y_{\pi1(j),2}$, and $y_{\pi1(j),3}$, respectively, such that $y_{\pi1(j)} = y_{\pi1(j),1} + y_{\pi1(j),2} + y_{\pi1(j),3}$ is satisfied by using the random values $r_{j,1}$ and $r_{j,2}$ in coordination with each other. Concretely, $y_{\pi1(j),1}$, $y_{\pi1(j),2}$, and $y_{\pi1(j),3}$ are computed as follows.

$y_{\pi1(j),1} = x_{\pi1(j),1} - r_{j,1}$ $y_{\pi1(j),2} = x_{\pi1(j),2} + r_{j,1} + r_{j,2}$ $y_{\pi1(j),3} = x_{\pi1(j),3} - r_{j,2}$ (Step 1-3) Next, the secure computation servers $P_1$, $P_2$, and $P_3$ transmit their computation results to the secure computation server $P_4$ operating as the receiving node. Concretely, the secure computation server $P_1$ transmits vec{$y_1$}−vec{$y_2$} as vec{$m_{1,1}$} to the secure computation server $P_4$. The secure computation server $P_2$ transmits vec{$y_2$}−vec{$y_3$} as vec{$m_{2,2}$} to the secure computation server $P_4$. In addition, the secure computation server $P_3$ transmits vec{$y_1$}−vec{$y_3$} as verification data vec{$m_3$} to the secure computation server $P_4$. As expressed by [Math. 3], vec{$y_i$} is the m dimensional vector, for example, expressed by $([y_{\pi1,1\ (1),i}], \ldots, [y_{\pi1\ (m),i}])$.

(Step 1-4) Next, the secure computation server $P_4$ performs fraud detection based on whether or not vec{$m_3$}=vec{$m_{1,1}$}+vec{$m_{2,2}$} is established. If vec{$m_3$}=vec{$m_{1,1}$}+vec{$m_{2,2}$} is established, the secure computation server $P_4$ determines that the mini-shuffle has been performed correctly and proceeds to the next round. However, if vec{$m_3$}=vec{$m_{1,1}$}+vec{$m_{2,2}$} is not established, the secure computation server $P_4$ determines that a fraudulent shuffle has been performed and aborts the subsequent processing.

As a result of the above mini-shuffle, the secure computation servers $P_1$ to $P_4$ each hold a mini-shuffled m dimensional vector, as expressed by the following expression [Math. 4].

$$P_1: (\vec{y_1}, \vec{y_2}) = ((y_{\pi_1(1),1}, y_{\pi_1(1),2}), \ldots, (y_{\pi_1(m),1}, y_{\pi_1(m),2})) = ([y_{\pi_1(1)}]_1, \ldots, [y_{\pi_1(m)}]_1) \quad \text{[Math. 4]}$$

$$P_2: (\vec{y_2}, \vec{y_3}) = ((y_{\pi_1(1),2}, y_{\pi_1(1),3}), \ldots, (y_{\pi_1(m),2}, y_{\pi_1(m),3})) = ([y_{\pi_1(1)}]_2, \ldots, [y_{\pi_1(m)}]_2)$$

$$P_3: (\vec{y_3}, \vec{y_1}) = ((y_{\pi_1(1),3}, y_{\pi_1(1),1}), \ldots, (y_{\pi_1(m),3}, y_{\pi_1(m),1})) = ([y_{\pi_1(1)}]_3, \ldots, [y_{\pi_1(m)}]_3)$$

$$P_4: (\vec{m_{1,1}}, \vec{m_{2,2}}) = (\vec{y_1} - \vec{y_2}, \vec{y_2} - \vec{y_3})$$

$$= ((y_{\pi_1(1),1} - y_{\pi_1(1),2}, y_{\pi_1(1),2} - y_{\pi_1(1),3}), \ldots, (y_{\pi_1(m),1} - y_{\pi_1(m),1}, y_{\pi_1(m),2} - y_{\pi_1(m),3}))$$

$$= ([y_{\pi_1(1)}]_4, \ldots, [y_{\pi_1(m)}]_4)$$

[Round 2 i=2]

Figure 8:
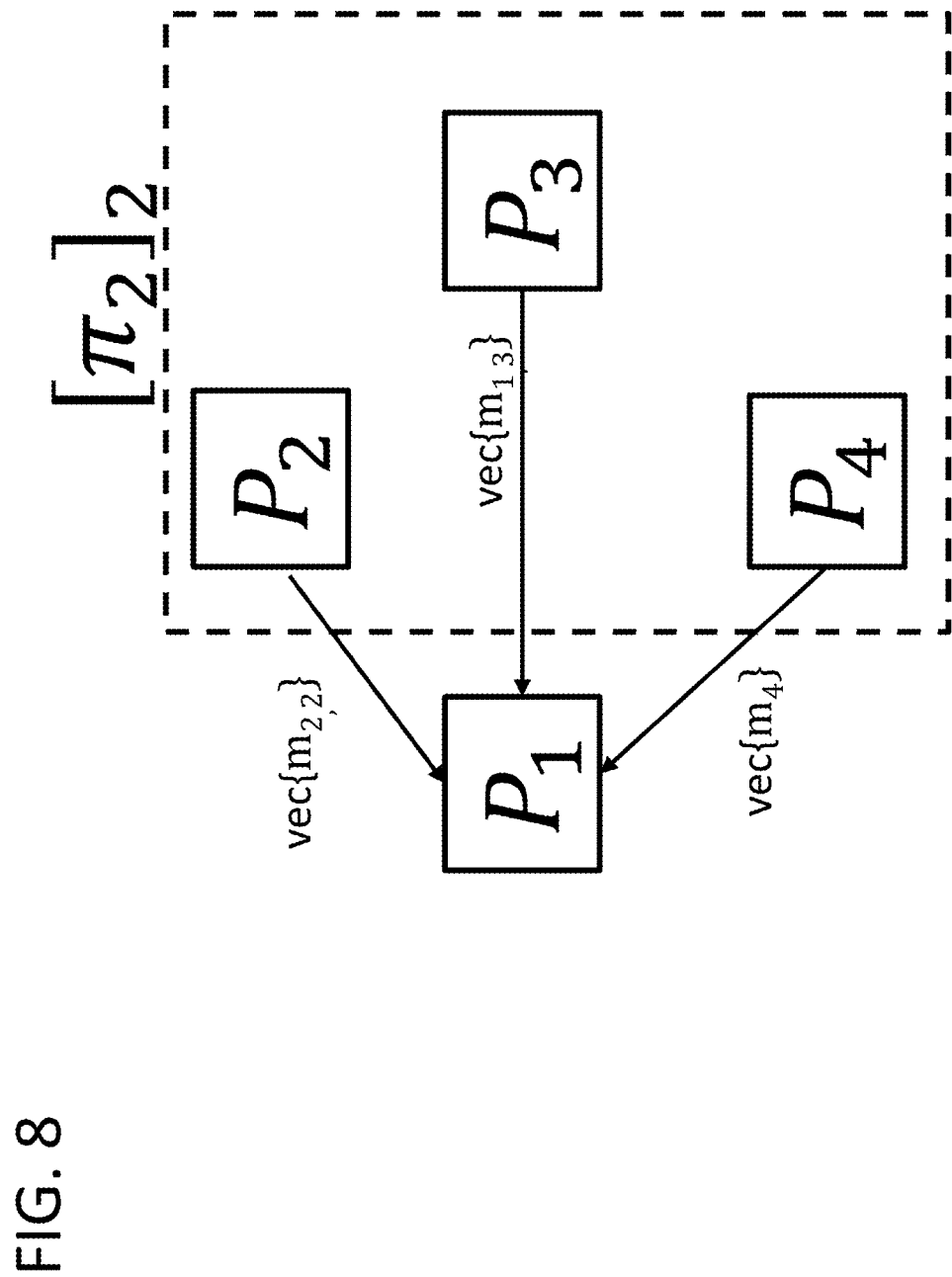
FIG. 8 is a diagram illustrating an operation in a round (i=2) according to the first example embodiment of the present invention.

FIG. 8 is a diagram illustrating an operation in a round (i=2). In round 2, the secure computation server $P_1$ operates as the receiving node. In addition, the secure computation servers $P_2$ and $P_3$ operate as the resharing nodes, and the secure computation server $P_4$ operates as the verifying node. The mini-shuffle in round 2 is expressed by the following expression [Math. 5].

$$[\vec{y}]^m \leftarrow \text{MiniShuffle}(2, [\vec{x}]^m, [\pi_2]_2) \quad \text{[Math. 5]}$$

$[\pi]_2$ on the right-hand side is a permutation $[\pi]_i$ that only the secure computation servers $P_2$, $P_3$, and $P_4$ know.

An output [vec{y}]$^m$ obtained from the above right-hand side content as the input is a result of a single mini-shuffle using the permutation $[\pi]_2$ and is expressed by $[y_{\pi 2(1)}], \ldots, [y_{\pi 2(m)}]$. $y_{\pi 2(j)}$ in this output is also shared and held in the secure computation server $P_i$ such that $y_{\pi 2(j)} = y_{\pi 2(j),1} + y_{\pi 2(j),2} + y_{\pi 2(j),3}$ (j=1, ..., m) is satisfied, as described above.

The following expression [Math. 6] illustrates the above mini-shuffle procedure.

[Math. 6]

1. $P_2$, $P_3$, and $P_4$ generate the random values $r_{j,1}$ and $r_{j,2}$.

$$r_{j,1} = H(vid_1 \| 1 \| j, seed_3)$$

$$r_{j,2} = H(vid_1 \| 2 \| j, seed_3)$$

2. We set $y_{\pi_2(j)} = y_{\pi_2(j),1} + y_{\pi_2(j),2} + y_{\pi_2(j),3}$.

2-1. $P_2$ computes $y_{\pi_2(j),2}$ and $y_{\pi_2(j),3}$ as follows.

$$y_{\pi_2(j),2} = x_{\pi_2(j),2} + r_{j,1} + r_{j,2}$$

$$y_{\pi_2(j),3} = x_{\pi_2(j),3} - r_{j,2}$$

2-2. $P_3$ computes $y_{\pi_2(j),1}$ and $y_{\pi_2(j),3}$ as follows.

$$y_{\pi_2(j),1} = x_{\pi_2(j),1} - r_{j,1}$$

$$y_{\pi_2(j),3} = x_{\pi_2(j),3} - r_{j,2}$$

2-3. $P_4$ computes $y_{\pi_2(j),1} - y_{\pi_2(j),2}$ and $y_{\pi_2(j),2} - y_{\pi_2(j),3}$ as follows.

$$y_{\pi_2(j),1} - y_{\pi_2(j),2} = (x_{\pi_2(j),1} - x_{\pi_2(j),2}) - 2r_{j,1} - r_{j,2}$$

$$y_{\pi_2(j),2} - y_{\pi_2(j),3} = (x_{\pi_2(j),2} - x_{\pi_2(j),3}) + 2r_{j,1} + r_{j,2}$$

3. $P_2$ sends $\vec{m_{2,2}} = \vec{y_2}$ to $P_1$.

$P_3$ sends $\vec{m_{1,3}} = \vec{y_1}$ to $P_1$.

$P_4$ sends $\vec{m_4} = \vec{y_1} - \vec{y_2}$ to $P_1$.

$$\vec{y_1} = (y_{\pi_2(1),i}, \ldots, y_{\pi_2(m),i})$$

4. $P_1$ checks whether $\vec{m_4} = \vec{m_{1,3}} - \vec{m_{2,2}}$ or not.

If it holds, then $P_1$ outputs continue.

If it does not hold, then $P_1$ outputs abort.

(Step 2-1) First, the secure computation servers $P_2$, $P_3$, and $P_4$ generate two random values $r_{j,1}$ and $r_{j,2}$ by using the seed, seed$_3$ that the secure computation server $P_1$ operating as the receiving node does not know.

(Steps 2-2-1 to 2-2-3) Next, the secure computation servers $P_2$, $P_3$, and $P_4$ compute $y_{\pi 2(j),1}$, $y_{\pi 2(j),2}$, and $y_{\pi 2(j),3}$ such that $y_{\pi 2(j)} = y_{\pi 2(j),1} + y_{\pi 2(j),2} + y_{\pi 2(j),3}$ (mod R) is satisfied by using the random values $r_{j,1}$ and $r_{j,2}$ in coordination with each other. Concretely, $y_{\pi 2(j),1}$, $y_{\pi 2(j),2}$, and $y_{\pi 2(j),3}$ are computed as follows.

$$y_{\pi 2(j),1} = x_{\pi 2(j),1} | r_{j,1}$$

$$y_{\pi 2(j),2} = x_{\pi 2(j),2} + r_{j,1} + r_{j,2}$$

$$y_{\pi 2(j),3} = x_{\pi 2(j),3} - r_{j,2}$$

In addition, the secure computation server $P_4$ computes $y_{\pi 2(j),1} - y_{\pi 2(j),2}$ and $y_{\pi 2(j),2} - y_{\pi 2(j),3}$, as illustrated in [Math. 6].

(Step 2-3) Next, the secure computation servers $P_2$, $P_3$ and $P_4$ transmit their computation results to the secure computation server $P_1$ operating as the receiving node. Concretely, the secure computation server $P_2$ transmits $vec\{y_2\}$ as $vec\{m_{2,2}\}$ to the secure computation server $P_1$. The secure computation server $P_3$ transmits $vec\{y_1\}$ as $vec\{m_{1,3}\}$ to the secure computation server $P_1$. In addition, the secure computation server $P_4$ transmits $vec\{y_1\} - vec\{y_2\}$ as verification data $vec\{m_4\}$ to the secure computation server $P_1$. As expressed by [Math. 6], $vec\{y_i\}$ is the m dimensional vector, for example, expressed by $([y_{\pi 2\ (1),\ i}], \ldots, [y_{\pi 2\ (m),\ i}])$.

(Step 2-4) Next, the secure computation server $P_1$ performs fraud detection based on whether or not $vec\{m_4\} = vec\{m_{1,3}\}\ vec\{m_{2,2}\}$ is established. If $vec\{m_4\} = vec\{m_{1,3}\}\ vec\{m_{2,2}\}$ is established, the secure computation server $P_1$ determines that the mini-shuffle has been performed correctly and proceeds to the next round. However, if $vec\{m_4\} = vec\{m_{1,3}\} + vec\{m_{2,2}\}$ is not established, the secure computation server $P_1$ determines that a fraudulent shuffle has been performed and aborts the subsequent processing.

As a result of the above mini-shuffle, the secure computation servers $P_1$ to $P_4$ each hold a mini-shuffled m dimensional vector, as expressed by the following expression [Math. 7].

[Math. 7]

$$P_1: (\vec{m_{1,3}}, \vec{m_{2,2}}) = (\vec{y_1}, \vec{y_2})$$

$$= ((y_{\pi_2(1),1}, y_{\pi_2(1),2}), \ldots, (y_{\pi_2(m),1}, y_{\pi_2(m),2})) = ([y_{\pi_2(1)}]_1, \ldots, [y_{\pi_2(m)}]_1)$$

$$P_2: (\vec{y_2}, \vec{y_3}) = ((y_{\pi_2(1),2}, y_{\pi_2(1),3}), \ldots, (y_{\pi_2(m),2}, y_{\pi_2(m),3})) = ([y_{\pi_2(1)}]_2, \ldots, [y_{\pi_2(m)}]_2)$$

$$P_3: (\vec{y_3}, \vec{y_1}) = ((y_{\pi_2(1),3}, y_{\pi_2(1),1}), \ldots, (y_{\pi_2(m),3}, y_{\pi_2(m),1})) = ([y_{\pi_2(1)}]_3, \ldots, [y_{\pi_2(m)}]_3)$$

$$P_4: (\vec{y_1} - \vec{y_2}, \vec{y_2} - \vec{y_3}) = ((y_{\pi_2(1),1} - y_{\pi_2(1),2}, y_{\pi_2(1),2} - y_{\pi_2(1),3}), \ldots, (y_{\pi_2(m),1} - y_{\pi_2(m),2}, y_{\pi_2(m),2} - y_{\pi_2(m),3}))$$

$$= ([y_{\pi_2(1)}]_4, \ldots, [y_{\pi_2(m)}]_4)$$

[Round 3 i=3]

Figure 9:
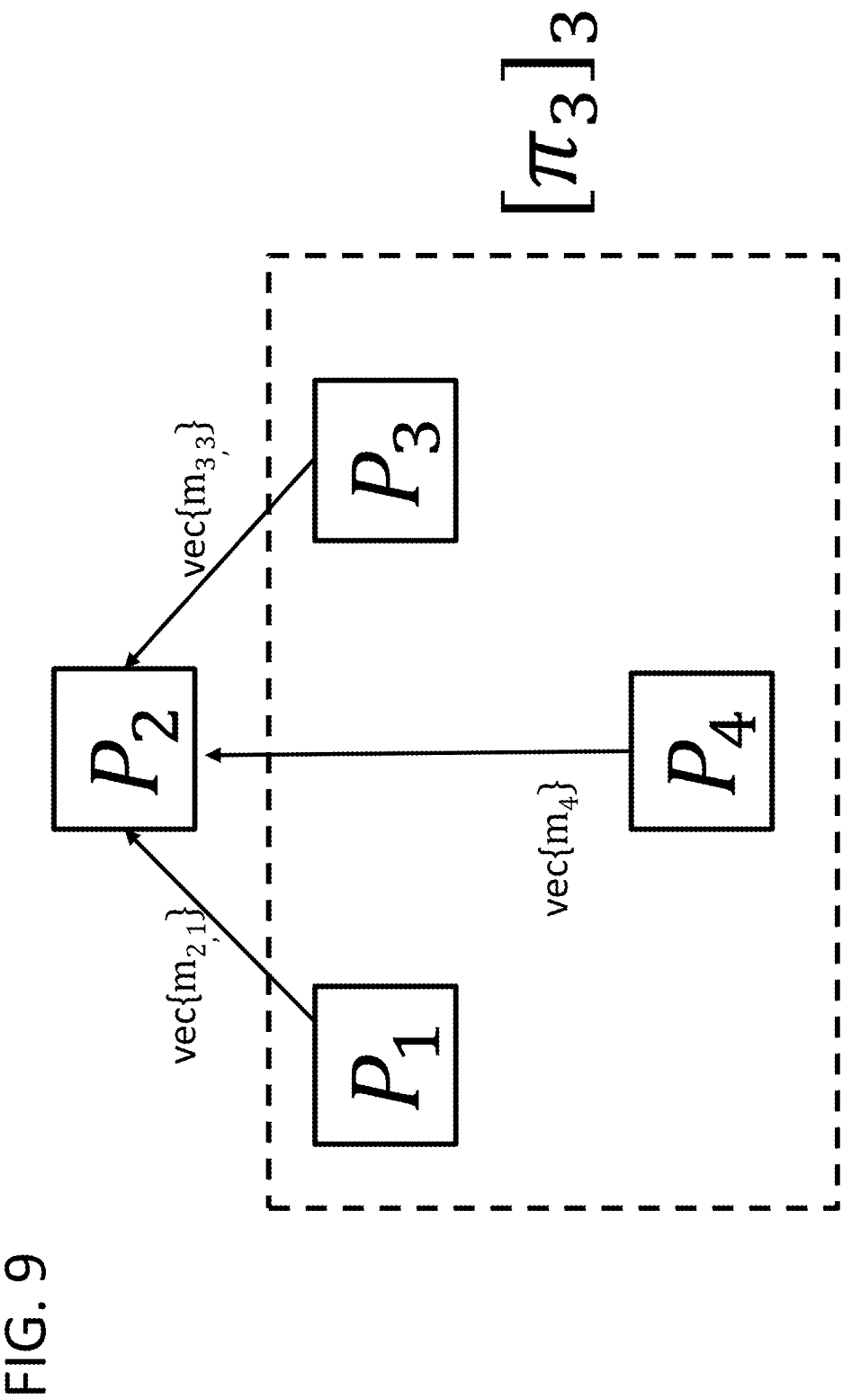
FIG. 9 is a diagram illustrating an operation in a round (i=3) according to the first example embodiment of the present invention.

FIG. 9 is a diagram illustrating an operation in a round (i=3). In round 3, the secure computation server $P_2$ operates as the receiving node. In addition, the secure computation servers $P_3$ and $P_1$ operate as the resharing nodes, and the secure computation server $P_4$ operates as the verifying node. The mini-shuffle in round 3 is expressed by the following expression [Math. 8].

$$[\vec{y}]^m \leftarrow \text{MiniShuffle}(3, [\vec{x}]^m, [\pi_3]_3) \qquad \text{[Math. 8]}$$

$[\pi]_3$ on the right-hand side is a permutation $[\pi]_i$ that only the secure computation servers $P_1$, $P_3$, and $P_4$ know.

An output $[vec\{y\}]^m$ obtained from the above right-hand side content as the input is a result of a single mini-shuffle using the permutation $[\pi]_3$ and is expressed by $[y_{\pi 3\ (1)}], \ldots, [y_{\pi 3(m)}]$. $y_{\pi 3(j)}$ in this output is also shared and held in the secure computation server $P_i$ such that $y_{\pi 3\ (j)} = y_{\pi 3\ (j),1} + y_{\pi 3\ (j),2} + y_{\pi 3\ (j),3}$ (j=1, ..., m) is satisfied, as described above.

The following expression [Math. 9] illustrates the above mini-shuffle procedure.

[Math. 9]

1. $P_3$, $P_4$, and $P_1$ generate the random values $r_{j,1}$ and $r_{j,2}$.

$$r_{j,1} = H(vid_1 \| 1 \| j, seed_1)$$

$$r_{j,2} = H(vid_1 \| 2 \| j, seed_1)$$

2. We set $y_{\pi_3(j)} = y_{\pi_3(j),1} + y_{\pi_3(j),2} + y_{\pi_3(j),3}$.

2-1. $P_3$ computes $y_{\pi_3(j),1}$ and $y_{\pi_3(j),3}$ as follows.

$$y_{\pi_3(j),1} = x_{\pi_3(j),2} - r_{j,1}$$

$$y_{\pi_3(j),3} = x_{\pi_3(j),3} - r_{j,2}$$

2-2. $P_1$ computes $y_{\pi_3(j),1}$ and $y_{\pi_3(j),2}$ as follows.

$$y_{\pi_3(j),1} = x_{\pi_3(j),1} - r_{j,1}$$

$$y_{\pi_3(j),2} = x_{\pi_3(j),2} + r_{j,1} + r_{j,2}$$

2-3. $P_4$ computes $y_{\pi_3(j),1} - y_{\pi_3(j),2}$ and $y_{\pi_3(j),2} - y_{\pi_3(j),3}$ as follows:

$$y_{\pi_3(j),1} - y_{\pi_3(j),2} = (x_{\pi_3(j),1} - x_{\pi_3(j),2}) - 2r_{j,1} - r_{j,2}$$

$$y_{\pi_3(j),2} - y_{\pi_3(j),3} = (x_{\pi_3(j),2} - x_{\pi_3(j),3}) + r_{j,1} + 2r_{j,2}$$

3. $P_1$ sends $\vec{m_{2,1}} = \vec{y_2}$ to $P_2$.

$P_3$ sends $\vec{m_{3,3}} = \vec{y_3}$ to $P_2$.

the secure computation server $P_4$ transmits $\text{vec}\{y_2\} - \text{vec}\{y_3\}$ as verification data $\text{vec}\{m_4\}$ to the secure computation server $P_2$. As expressed by [Math. 9], $\text{vec}\{y_i\}$ is the m dimensional vector, for example, expressed by $([y_{\pi_3(1),i}], \ldots, [y_{\pi_3(m),i}])$.

(Step 3-4) Next, the secure computation server $P_2$ performs fraud detection based on whether or not $\text{vec}\{m_4\} = \text{vec}\{m_{2,1}\} - \text{vec}\{m_{3,3}\}$ is established. If $\text{vec}\{m_4\} = \text{vec}\{m_{2,1}\} - \text{vec}\{m_{3,3}\}$ is established, the secure computation server $P_2$ determines that the mini-shuffle has been performed correctly and proceeds to the next round. However, if $\text{vec}\{m_4\} = \text{vec}\{m_{2,1}\} - \text{vec}\{m_{3,3}\}$ is not established, the secure computation server $P_2$ determines that a fraudulent shuffle has been performed and aborts the subsequent processing.

As a result of the above mini-shuffle, the secure computation servers $P_1$ to $P_4$ each hold a mini-shuffled m dimensional vector, as expressed by the following expression [Math. 10].

$$P_1: (\vec{y_1}, \vec{y_2}) = ((y_{\pi_3(1),1}, y_{\pi_3(1),2}), \ldots, (y_{\pi_3(m),1}, y_{\pi_3(m),2})) = ([y_{\pi_3(1)}]_1, \ldots, [y_{\pi_3(m)}]_1)$$

$$P_2: (\vec{m_{2,1}}, \vec{m_{3,3}}) = (\vec{y_2}, \vec{y_3})$$

$$= ((y_{\pi_3(1),2}, y_{\pi_3(1),3}), \ldots, (y_{\pi_3(m),2}, y_{\pi_3(m),3})) = ([y_{\pi_3(1)}]_2, \ldots, [y_{\pi_3(m)}]_2)$$

$$P_3: (\vec{y_3}, \vec{y_1}) = ((y_{\pi_3(1),3}, y_{\pi_3(1),1}), \ldots, (y_{\pi_3(m),3}, y_{\pi_3(m),1})) = ([y_{\pi_3(1)}]_3, \ldots, [y_{\pi_3(m)}]_3)$$

$$P_4: (\vec{y_1} - \vec{y_2}, \vec{y_2} - \vec{y_3}) = ((y_{\pi_3(1),1}, y_{\pi_3(1),2} - y_{\pi_3(1),3}), \ldots, (y_{\pi_3(m),1} - y_{\pi_3(m),2}, y_{\pi_3(m),2} - y_{\pi_3(m),3}))$$

$$= ([y_{\pi_3(1)}]_4, \ldots, [y_{\pi_3(m)}]_4)$$

[Math. 10]

$P_4$ sends $\vec{m_4} = \vec{y_2} - \vec{y_3}$ to $P_2$.

$\vec{y_i} = (y_{\pi_3(1),i}, \ldots, y_{\pi_3(m),i})$

4. $P_2$ checks whether $\vec{m_4} = \vec{m_{2,1}} - \vec{m_{3,3}}$ or not.

If it holds, then $P_2$ outputs continue.

If it does not hold, then $P_2$ outputs abort.

(Step 3-1) First, the secure computation servers $P_3$, $P_4$, and $P_1$ generate two random values $r_{j,1}$ and $r_{j,2}$ by using the seed seeds that the secure computation server $P_2$ operating as the receiving node does not know.

(Steps 3-2-1 to 3-2-3) Next, the secure computation servers $P_3$, $P_4$, and $P_1$ compute $y_{\pi_3(j),1}$, $y_{\pi_3(j),2}$, and $y_{\pi_3(j),3}$ such that $y_{\pi_3(j)} = y_{\pi_3(j),1} + y_{\pi_3(j),2} + y_{\pi_3(j),3}$ (mod R) is satisfied by using the random values $r_{j,1}$ and $r_{j,2}$ in coordination with each other. Concretely, $y_{\pi_3(j),1}$, $y_{\pi_3(j),2}$, and $y_{\pi_3(j),3}$ are computed as follows.

$$y_{\pi_3(j),1} = x_{\pi_3(j),1} - r_{j,1}$$

$$y_{\pi_3(j),2} = x_{\pi_3(j),2} + r_{j,1} + r_{j,2}$$

$$y_{\pi_3(j),3} = x_{\pi_3(j),3} - r_{j,2}$$

In addition, the secure computation server $P_4$ computes $y_{\pi_3(j),1} - y_{\pi_3(j),2}$ and $y_{\pi_3(j),2} - y_{\pi_3(j),3}$, as illustrated in [Math. 9].

(Step 3-3) Next, the secure computation servers $P_3$, $P_4$, and $P_1$ transmit their computation results to the secure computation server $P_2$ operating as the receiving node. Concretely, the secure computation server $P_3$ transmits $\text{vec}\{y_3\}$ as $\text{vec}\{m_{3,3}\}$ to the secure computation server $P_2$. The secure computation server $P_1$ transmits $\text{vec}\{y_2\}$ as $\text{vec}\{m_{2,1}\}$ to the secure computation server $P_2$. In addition,

[Round 4 i=4]

Figure 10:
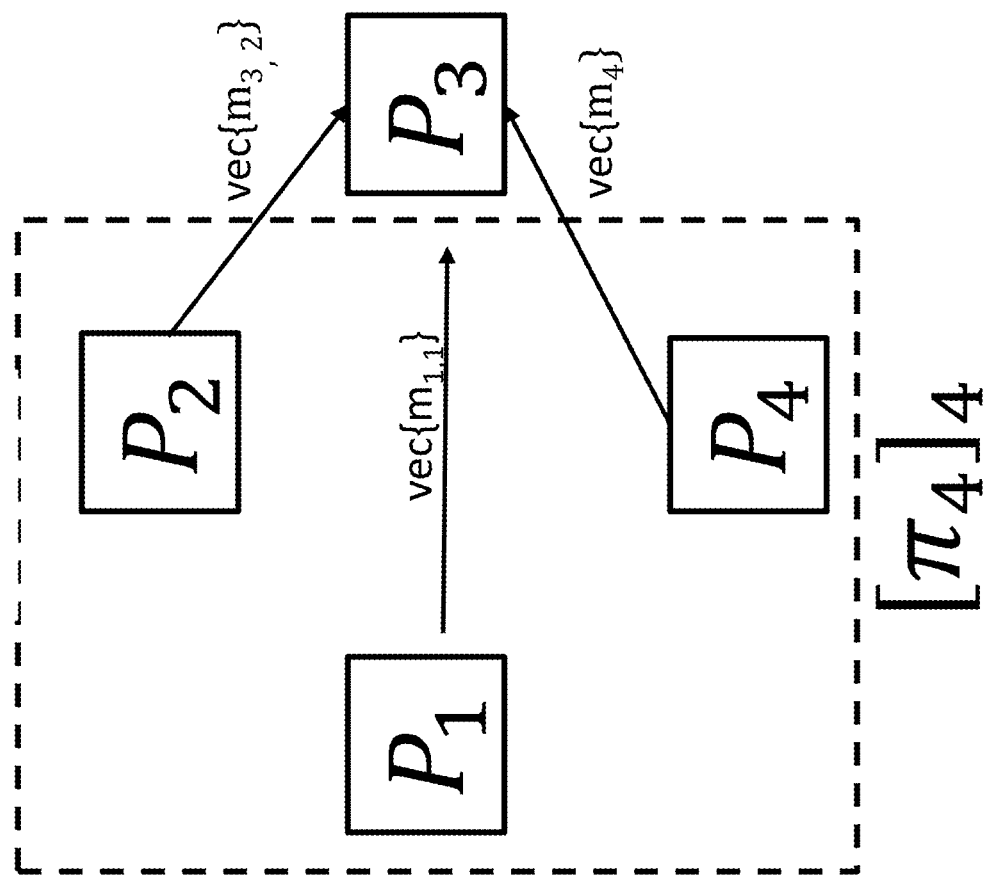
FIG. 10 is a diagram illustrating an operation in a round (i=4) according to the first example embodiment of the present invention.

FIG. 10 is a diagram illustrating an operation in a round (i=4). In round 4, the secure computation server $P_3$ operates as the receiving node. In addition, the secure computation servers $P_1$ and $P_2$ operate as the resharing nodes, and the secure computation server $P_4$ operates as the verifying node. The mini-shuffle in round 4 is expressed by the following expression [Math. 11].

$$[\vec{y}]^m \leftarrow \text{MiniShuffle}(4, [\vec{x}]^m, [\pi_4]_4)$$

[Math. 11]

$[\pi]_4$ on the right-hand side is a permutation $[\pi]_i$ that only the secure computation servers $P_1$, $P_2$, and $P_4$ know.

An output $[\text{vec}\{y\}]^m$ obtained from the above right-hand side content as the input is a result of a single mini-shuffle using the permutation $[\pi]_4$ and is expressed by $[y_{\pi_4(1)}], \ldots, [y_{\pi_4(m)}]$. $y_{\pi_4(j)}$ in this output is also shared and held in the secure computation server $P_i$ such that $y_{\pi_4(j)} = y_{\pi_4(j),1} + y_{\pi_4(j),2} + y_{\pi_4(j),3}$ (j=1, ..., m) is satisfied, as described above.

The following expression [Math. 12] illustrates the above mini-shuffle procedure.

[Math. 12]

1. $P_4$, $P_1$, and $P_2$ generate the random values $r_{j,1}$ and $r_{j,2}$.

$$r_{j,1} = H(\text{vid}_1 \| 1 \| j, \text{seed}_2)$$

$$r_{j,2} = H(\text{vid}_1 \| 2 \| j, \text{seed}_2)$$

2. We set $y_{\pi_4(j)} = y_{\pi_4(j),1} + y_{\pi_4(j),2} + y_{\pi_4(j),3}$.

2-1. $P_1$ computes $y_{\pi_4(j),1}$ and $y_{\pi_4(j),2}$ as follows.

$$y_{\pi_4(j),1} = x_{\pi_4(j),1} - r_{j,1}$$

$$y_{\pi_4(j),2} = x_{\pi_4(j),2} + r_{j,1} + r_{j,2}$$

2-2. $P_2$ computes $y_{\pi_4(j),2}$ and $y_{\pi_4(j),3}$ as follows.

$y_{\pi_4(j),2} = x_{\pi_4(j),2} + r_{j,1} + r_{j,2}$ $y_{\pi_4(j),3} = x_{\pi_4(j),3} - r_{j,2}$ 2-3. $P_4$ computes $y_{\pi_4(j),1} - y_{\pi_4(j),2}$ and $y_{\pi_4(j),2} - y_{\pi_4(j),3}$ as follows.

$y_{\pi_4(j),1} - y_{\pi_4(j),2} = (x_{\pi_4(j),1} - x_{\pi_4(j),2}) - 2r_{j,1} - r_{j,2}$ $y_{\pi_4(j),2} - y_{\pi_4(j),3} = (x_{\pi_4(j),2} - x_{\pi_4(j),3}) + r_{j,1} + 2r_{j,2}$

3. $P_1$ sends $\vec{m_{1,1}} = \vec{y_1}$ to $P_3$.

$$P_1: (\vec{y_1}, \vec{y_2}) = ((y_{\pi_4(1),1}, y_{\pi_4(1),2}), \ldots, (y_{\pi_4(m),1}, y_{\pi_4(m),2})) = ([y_{\pi_4(1)}]_1, \ldots, [y_{\pi_4(m)}]_1)$$ [Math. 13]

$$P_2: (\vec{y_2}, \vec{y_3}) = ((y_{\pi_4(1),2}, y_{\pi_4(1),3}), \ldots, (y_{\pi_4(m),2}, y_{\pi_4(m),3})) = ([y_{\pi_4(1)}]_2, \ldots, [y_{\pi_4(m)}]_2)$$

$$P_3: (-\vec{m_4} + \vec{m_{1,1}}, \vec{m_{1,1}}) = (\vec{y_3}, \vec{y_1})$$

$$= ((y_{\pi_4(1),3}, y_{\pi_4(1),1}), \ldots, (y_{\pi_4(m),3}, y_{\pi_4(m),1})) = ([y_{\pi_4(1)}]_3, \ldots, [y_{\pi_4(m)}]_3)$$

$$P_4: (\vec{y_1} - \vec{y_2}, \vec{y_2} - \vec{y_3}) = ((y_{\pi_4(1),1} - y_{\pi_4(1),2}, y_{\pi_4(1),2} - y_{\pi_4(1),3}), \ldots, (y_{\pi_4(m),1} - y_{\pi_4(m),2}, y_{\pi_4(m),2} - y_{\pi_4(m),3}))$$

$$= ([y_{\pi_4(1)}]_4, \ldots, [y_{\pi_4(m)}]_4)$$

$P_2$ sends $\vec{m_{3,2}} = \vec{y_3}$ to $P_3$.
$P_4$ sends $\vec{m_4} = \vec{y_1} - \vec{y_3}$ to $P_3$.

$\vec{y_l} = (y_{\pi_4(1),l}, \ldots, y_{\pi_4(m),l})$

4. $P_3$ checks whether $\vec{m_4} = \vec{m_{1,1}} - \vec{m_{3,2}}$ or not.
If it holds, then $P_3$ outputs continue.
If it does not hold, then $P_3$ outputs abort.

(Step 4-1) First, the secure computation servers $P_4$, $P_1$, and $P_2$ generate two random values $r_{j,1}$ and $r_{j,2}$ by using the seed $seed_2$ that the secure computation server $P_3$ operating as the receiving node does not know.

(Steps 4-2-1 to 4-2-3) Next, the secure computation servers $P_4$, $P_1$, and $P_2$ compute $y_{\pi_4(j),1}$, $y_{\pi_4(j),2}$, and $y_{\pi_4(j),3}$ such that $y_{\pi_4(j)} = y_{\pi_4(j),1} + y_{\pi_4(j),2} + y_{\pi_4(j),3}$ (mod R) is satisfied by using the random values $r_{j,1}$ and $r_{j,2}$ in coordination with each other. Concretely, $y_{\pi_4(j),1}$, $y_{\pi_4(j),2}$, and $y_{\pi_4(j),3}$ are computed as follows.

$y_{\pi_4(j),1} = x_{\pi_4(j),1} - r_{j,1}$ $y_{\pi_4(j),2} = x_{\pi_4(j),2} + r_{j,1} + r_{j,2}$ $y_{\pi_4(j),3} = x_{\pi_4(j),3} - r_{j,2}$

In addition, the secure computation server $P_4$ computes $y_{\pi_4(j),1} - y_{\pi_3(j),2}$ and $y_{\pi_4(j),2} - y_{\pi_4(j),3}$, as illustrated in [Math. 12].

(Step 4-3) Next, the secure computation servers $P_4$, $P_1$, and $P_2$ transmit their computation results to the secure computation server $P_3$ operating as the receiving node. Concretely, the secure computation server $P_1$ transmits vec{$y_1$} as vec{$m_{1,1}$} to the secure computation server $P_3$. The secure computation server $P_2$ transmits vec{$y_3$} as vec{$m_{3,2}$} to the secure computation server $P_3$. In addition, the secure computation server $P_4$ transmits vec{$y_1$}−vec{$y_3$} as verification data vec{$m_4$} to the secure computation server $P_3$. As expressed by [Math. 12], vec{$y_i$} is the m dimensional vector, for example, expressed by ([$y_{\pi_4(1),i}$], ..., [$y_{\pi_4(m),i}$]).

(Step 4-4) Next, the secure computation server $P_3$ performs fraud detection based on whether or not vec{$m_4$}=vec{$m_{1,1}$}−vec{$m_{3,2}$} is established. If vec{$m_4$}=vec{$m_{1,1}$}−vec{$m_{3,2}$} is established, the secure computation server $P_3$ determines that the mini-shuffle has been performed correctly and complete the processing. However, if vec{$m_4$}=vec{$m_{1,1}$}−vec{$m_{3,2}$} is not established, the secure computation server $P_3$ determines that a fraudulent shuffle has been performed and aborts the subsequent processing.

As a result of the above mini-shuffle, the secure computation servers $P_1$ to $P_4$ each hold a mini-shuffled m dimensional vector, as expressed by the following expression [Math. 13].

By performing the above mini-shuffles, the permutation $[\pi]_i$ of the inputted $[vec\{x\}]^m$ can be performed four times. In addition, as described in the above rounds, while the permutation with $[\pi]_i$ is performed such that the permutation content is not known by the receiving node, the receiving node can determine a fraud determinately.

The four rounds of permutations described above can be expressed by the following [Math. 14].

1. $[\vec{w}]^m \leftarrow \text{MiniShuffle}(1, [\vec{v}]^m, [\pi_1]_1)$

2. $[\vec{x}]^m \leftarrow \text{MiniShuffle}(2, [\vec{w}]^m, [\pi_2]_2)$

3. $[\vec{y}]^m \leftarrow \text{MiniShuffle}(3, [\vec{x}]^m, [\pi_3]_3)$

4. $[\vec{z}]^m \leftarrow \text{MiniShuffle}(4, [\vec{y}]^m, [\pi_4]_4)$ [Math. 14]

In addition, since a communication of m elements whose ring size is κ bits is performed three times per round, the shuffle cost according to the present example embodiment is 12 κm bits in the total of 4 rounds.

Second Example Embodiment

In the above first example embodiment, it is described that four rounds are performed. However, by modifying the computation method, the shuffle, which is equivalent to the shuffle shown in the first example embodiment, can be achieved with only performing two rounds. Hereinafter, a second example embodiment that enables a shuffle with two rounds will be described. Since the second example embodiment can be achieved with the same configuration as that according to the first example embodiment, the second example embodiment will be described with a focus on the difference.

[Round 1 i=1,2]

Figure 11:
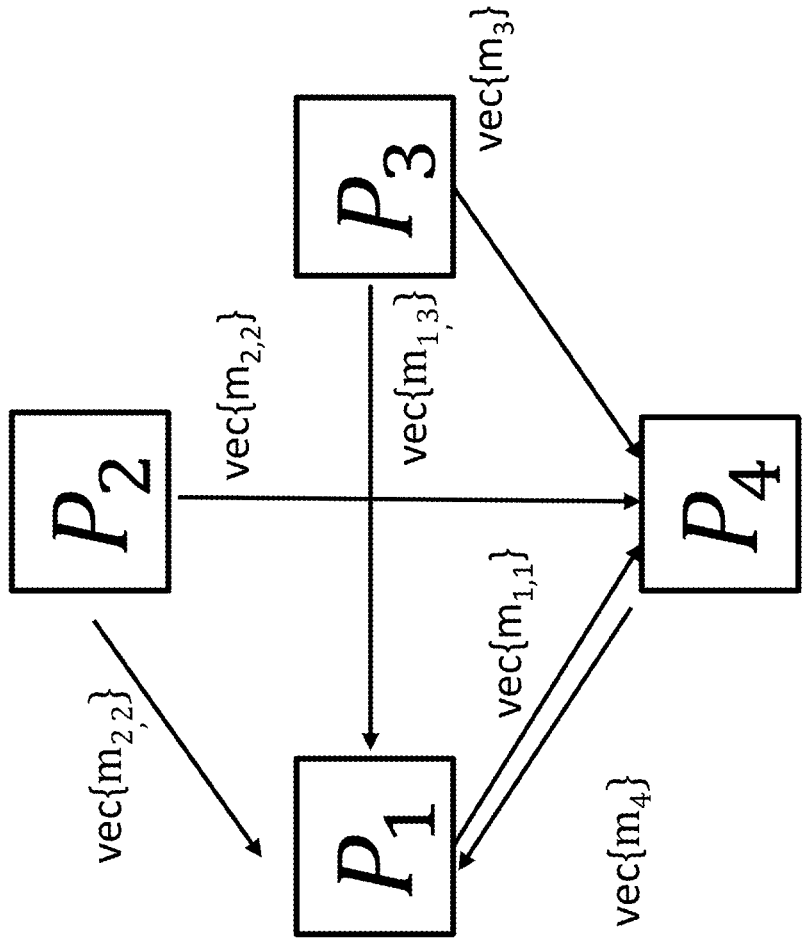
FIG. 11 is a diagram illustrating an operation in a round (i=1 and 2) according to a second example embodiment of the present invention.

FIG. 11 is a diagram illustrating an operation in round 1 (i=1 and 2) according to the second example embodiment. As illustrated in FIG. 11, according to the second example embodiment, computation and data transmission in round 1 and round 2 according to the first example embodiment are performed in parallel. Concretely, the secure computation server $P_1$ transmits vec{$y_1$}−vec{$y_2$} as vec{$m_{1,1}$} to the secure computation server $P_4$. The secure computation server $P_2$ transmits vec{$y_2$}−vec{$y_3$} as vec{$m_{2,2}$} to the secure computation server $P_4$. In addition, the secure computation server $P_3$ transmits vec{$y_1$}−vec{$y_3$} as verification data vec{$m_3$} to the secure computation server $P_4$. In parallel with this, the secure computation server $P_2$ transmits vec{$y_2$} as vec{$m_{2,2}$} to the secure computation server $P_1$. The secure computation server $P_3$ transmits vec{$y_1$} as vec{$m_{1,3}$} to the secure computation server $P_1$. In addition, the secure computation server $P_4$ transmits vec{$y_1$}−vec{$y_2$} as verification data vec{$m_4$} to the secure computation server $P_1$.

In this round, the secure computation server $P_2$ transmits vec{$m_{2,2}$} and vec{$m_{2,2}$}. Since the former is vec{$y_2$}−vec{$y_3$} as expressed by [Math. 3] and the latter is vec{$y_2$} as expressed by [Math. 6], these can be computed in parallel. Likewise, the secure computation server $P_3$ transmits vec{$m_3$} and vec{$m_{1,3}$}. Since the former is vec{$y_1$}−vec{$y_2$} as expressed by [Math. 3] and the latter is vec{$y_1$}, these can be computed in parallel.

Figure 12:
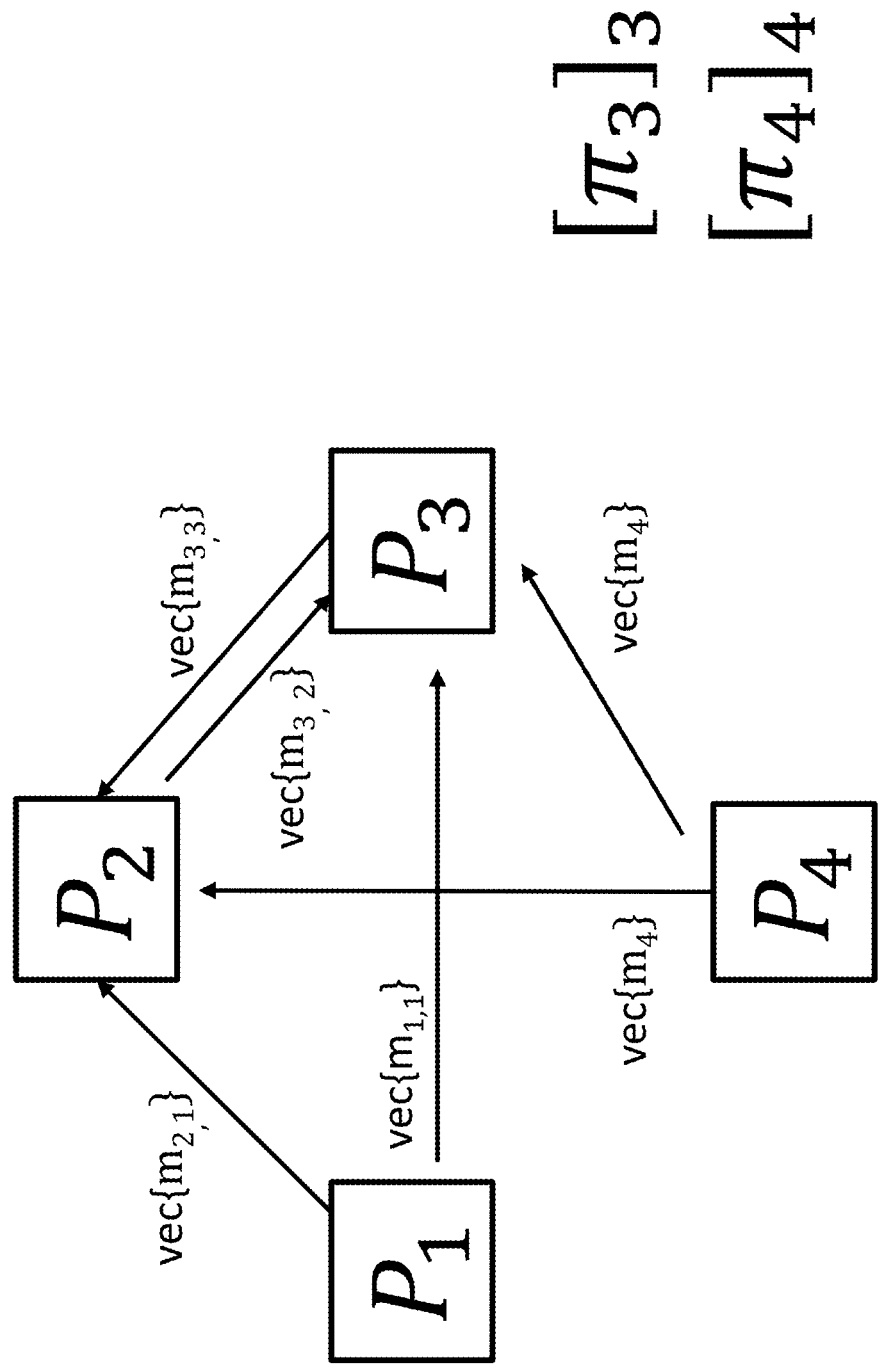
FIG. 12 is a diagram illustrating an operation in a round (i=3 and 4) according to the second example embodiment of the present invention.

FIG. 12 is a diagram illustrating an operation in round 2 (i=3 and 4) according to the second example embodiment. As illustrated in FIG. 12, according to the second example embodiment, computation and data transmission in round 3 and round 4 according to the first example embodiment are performed in parallel. Concretely, the secure computation server $P_1$ transmits vec{$y_2$} as vec{$m_{2,1}$} to the secure computation server $P_2$. The secure computation server $P_3$ transmits vec{$y_3$} as vec{$m_{3,3}$} to the secure computation server $P_2$. In addition, the secure computation server $P_4$ transmits vec{$y_2$}−vec{$y_3$} as verification data vec{$m_4$} to the secure computation server $P_2$. In parallel with this, the secure computation server $P_1$ transmits vec{$y_1$} as vec{$m_{1,1}$} to the secure computation server $P_3$. The secure computation server $P_2$ transmits vec{$y_3$} as vec{$m_{3,2}$} to the secure computation server $P_3$. In addition, the secure computation server $P_4$ transmits vec{$y_1$}−vec{$y_3$} as verification data vec{$m_4$} to the secure computation server $P_3$.

In this round, the secure computation server $P_1$ transmits vec{$m_{2,1}$} and vec{$m_{1,1}$}. Since the former is vec{$y_2$} as expressed by [Math. 9] and the latter is vec{$y_1$} as expressed by [Math. 12], these can be computed in parallel. Likewise, the secure computation server $P_4$ transmits vec{$m_4$} and vec{$m_4$}. Since the former is vec{$y_2$}−vec{$y_3$} as expressed by [Math. 9] and the latter is vec{$y_1$}−vec{$y_3$}, these can be computed in parallel. Of course, the receiving node can perform fraud detection by using the verification data in the present example embodiment as well.

In addition, as described above, according to the present example embodiment, the number of rounds can be reduced to 2. According to the present example embodiment, if the communication cost of the hash values is ignored, the communication cost can be reduced to 8 κm.

Third Example Embodiment

Next, a third example embodiment will be described. The third example embodiment is obtained by changing the verification method in the receiving node and the verifying node according to the above first example embodiment. Since the third example embodiment can be realized by the same configuration as that according to the first example embodiment, the following description will be made with a focus on the difference.

In the third example embodiment, steps 3 and 4 in the second half of the mini-shuffle are replaced by the steps in the following expression [Math. 15].

[Math. 15]

3. $P_1$ sends $\vec{m}_{1,1} = \vec{y}_1 - \vec{y}_2$ to $P_4$.
   $P_2$ sends $\vec{m}_{2,2} = \vec{y}_2 - \vec{y}_3$ to $P_4$.
   $P_3$ sends $v_3$ to $P_4$.
   $P_4$ computes $v'$.

$\vec{y}_i = (y_{\pi_1(1),i}, \ldots, y_{\pi_1(m),i})$

When $\vec{m}_{1,1} - \vec{m}_{2,2} = (m_1', \ldots, m_m')$ and $\vec{m}_3 = \vec{y}_1 - \vec{y}_3 = (m_{3,1}, \ldots, m_{3,m})$.

$\alpha_j = H(vid_1 \| j, seed_3), v' = \sum_{j=1}^m \alpha_j m_j'$, and $v_3 = \sum_{j=1}^m \alpha_j m_{3,j}$.

4. $P_4$ checks whether $v_3 = v'$ or not.
   If it holds, then $P_4$ outputs continue.
   If it does not hold, then $P_4$ outputs abort.

Figure 13:
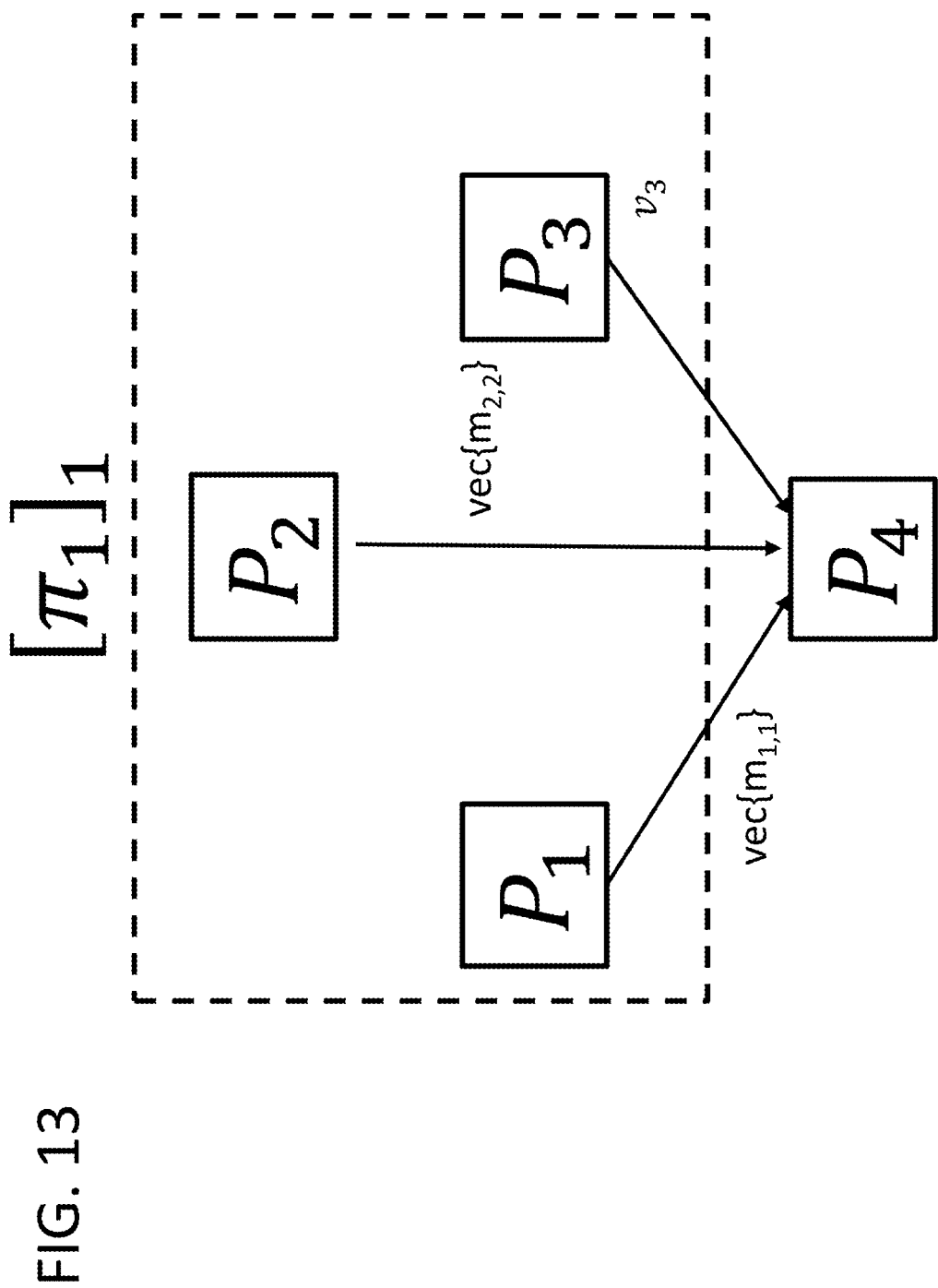
FIG. 13 is a diagram illustrating an operation in a round (i=1) according to a third example embodiment of the present invention.

Concretely, the secure computation server $P_1$ transmits vec{$y_1$}−vec{$y_2$} as vec{$m_{1,1}$} to the secure computation server $P_4$. The secure computation server $P_2$ transmits vec{$y_2$}−vec{$y_3$} as vec{$m_{2,2}$} to the secure computation server $P_4$. The operation so far is the same as that according to the first example embodiment. According to the third example embodiment, the secure computation server $P_3$ computes verification data $v_3$ and transmits the verification data $v_3$ to the secure computation server $P_4$ (see FIG. 13). The secure computation server $P_4$ computes a verification data $v'$.

The verification data $v_3$ and $v'$ are defined by the following expression [Math. 16].

When $\vec{m}_{1,1} - \vec{m}_{2,2} = (m_1', \ldots, m_m')$ and $\vec{m}_3 = \vec{y}_1 - \vec{y}_3 = (m_{3,1}, \ldots, m_{3,m})$, $\alpha_j = H(vid_1 \| j, seed_3), v' = \sum_{j=1}^m \alpha_j m_j'$, and $v_3 = \sum_{j=1}^m \alpha_j m_{3,j}$ [Math. 16]

Next, the secure computation server $P_4$ performs fraud detection by determining whether or not $v_3 = v'$ is established. If $v_3 = v'$ is established, the secure computation server $P_4$ determines that the mini-shuffle has been performed correctly and proceeds the next round. In contrast, if $v_3 = v'$ is not established, the secure computation server $P_4$ determines that a fraudulent shuffle has been performed and aborts the subsequent processing. Since the above verification can only be performed stochastically, it is preferable that the generation of $v'$ and the generation and transmission of $v_3$ be repeated by the number κ of security parameters (note that the transmission of $v_3$ may be performed together in one round).

In round 2 and thereafter, step 3 and the subsequent steps in [Math. 6], [Math. 9], and [Math. 12] are replaced by the corresponding steps in the following [Math. 17], [Math. 18], and [Math. 19].

[Math. 17]

3. $P_2$ sends $\vec{m}_{2,2} = \vec{y}_2$ to $P_1$.
   $P_3$ sends $\vec{m}_{1,3} = \vec{y}_1$ to $P_1$.
   $P_1$ sends $v_4$ to $P_1$.
   $P_1$ computes $v'$.

$\vec{y}_i = (y_{\pi_1(1),i}, \ldots, y_{\pi_1(m),i})$

When $\vec{m}_{2,2} - \vec{m}_{1,3} = (m_1', \ldots, m_m')$ and $\vec{m}_4 = (m_{4,1}, \ldots, m_{4,m})$.

$\alpha_j = H(vid_1 \| j, seed_1), v' = \sum_{j=1}^m \alpha_j m_j'$, and $v_3 = \sum_{j=1}^m \alpha_j m_{4,j}$.

4. $P_1$ checks whether $v_4=v'$ or not.
   If it holds, then $P_1$ outputs continue.
   If it does not hold, then $P_1$ outputs abort.

[Math. 18]

3. $P_1$ sends $\vec{m}_{2,1}=\vec{y}_2$ to $P_2$.
   $P_3$ sends $\vec{m}_{3,3}=\vec{y}_3$ to $P_2$.
   $P_4$ sends $v_3$ to $P_2$.
   $P_2$ computes $v'$.

$$\vec{y}_i=(y_{\pi_1(1),i},\ldots,y_{\pi_1(m),i})$$

When $\vec{m}_{2,1}-\vec{m}_{3,3}=(m_1',\ldots,m_m')$ and $\vec{m}_4=(m_{4,1},\ldots,m_{4,m})$.

$\alpha_j=H(vid_1\|j,seed_2), v'=\Sigma_{j=1}^{m}\alpha_j m_j'$, and $v_4=\Sigma_{j=1}^{m}\alpha_j m_{4,j}$.

4. $P_2$ checks whether $v_4=v'$ or not.
   If it holds, then $P_2$ outputs continue.
   If it does not hold, then $P_2$ outputs abort.

[Math. 19]

3. $P_1$ sends $\vec{m}_{1,1}=\vec{y}_1$ to $P_3$.
   $P_2$ sends $\vec{m}_{3,2}=\vec{y}_3$ to $P_3$.
   $P_4$ sends $v_4$ to $P_3$.
   $P_3$ computes $v'$.

$$\vec{y}_i=(y_{\pi_1(1),i},\ldots,y_{\pi_1(m),i})$$

When $\vec{m}_{1,1}-\vec{m}_{3,2}=(m_1',\ldots,m_m')$ and $\vec{m}_4=(m_{4,1},\ldots,m_{4,m})$.

$\alpha_j=H(vid_1\|j,seed_3), v'=\Sigma_{j=1}^{m}\alpha_j m_j'$, and $v_4=\Sigma_{j=1}^{m}\alpha_j m_{4,j}$.

4. $P_3$ checks whether $v_4=v'$ or not.
   If it holds, then $P_3$ outputs continue.
   If it does not hold, then $P_3$ outputs abort.

Figure 14:
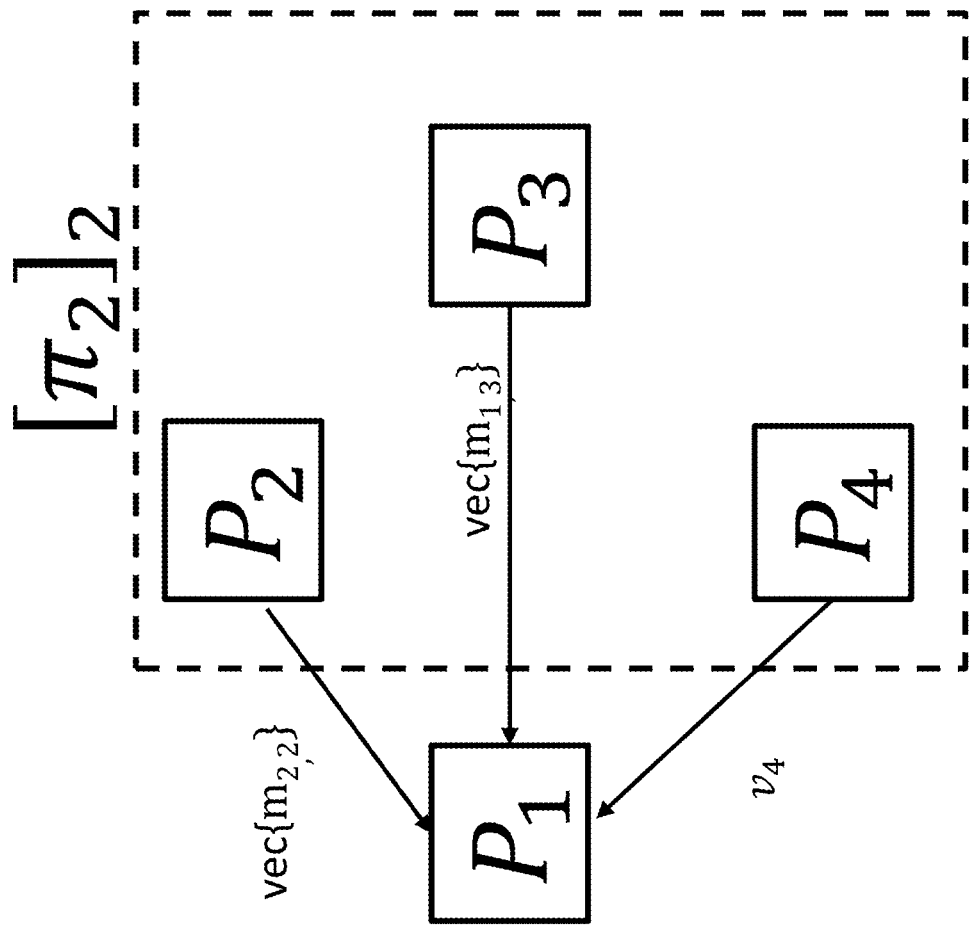
FIG. 14 is a diagram illustrating an operation in a round (i=2) according to the third example embodiment of the present invention.
Figure 15:
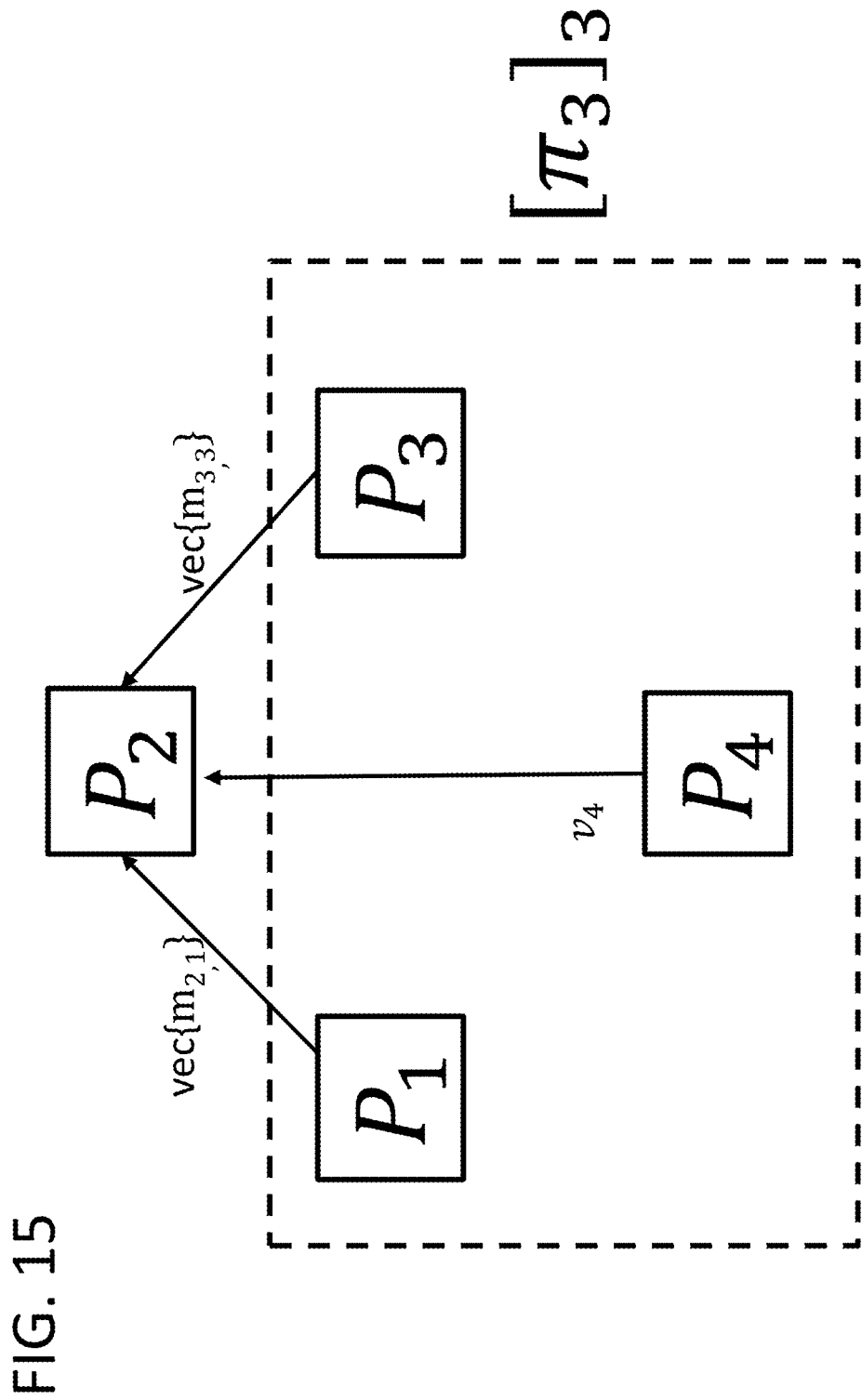
FIG. 15 is a diagram illustrating an operation in a round (i=3) according to the third example embodiment of the present invention.
Figure 16:
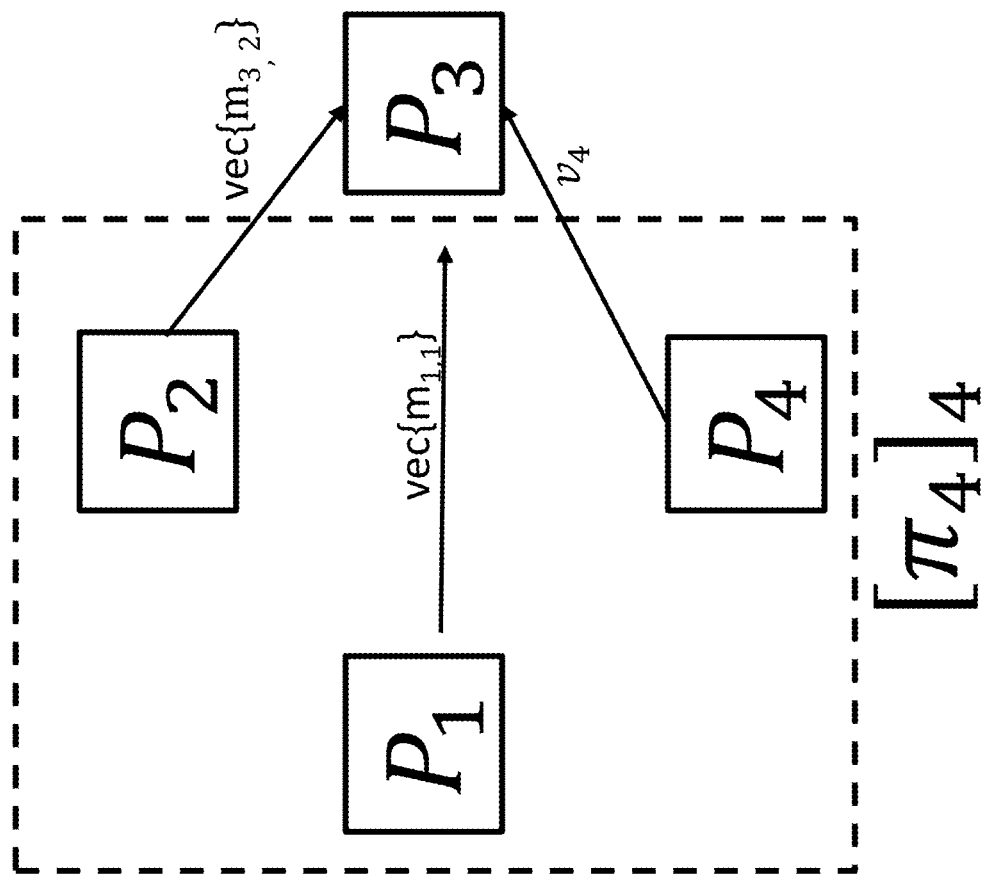
FIG. 16 is a diagram illustrating an operation in a round (i=4) according to the third example embodiment of the present invention.

In round 2 and thereafter, the processing is performed in the same manner. The secure computation server $P_4$ computes verification data $v_4$ and transmits the verification data $v_4$ to the secure computation server P operating as the receiving node (see FIG. 14 to FIG. 16). In addition, the secure computation server $P_4$ computes verification data $v'$. In round 2 and thereafter, since the verification using the above $v'$ and $v_4$ can only be performed stochastically, it is preferable that the generation of $v'$ and the generation and transmission of $v_4$ be repeated by the number κ of security parameters (note that the transmission of $v_4$ may be performed in one round).

The above verification data $v_4$ and $v'$ are defined by the following expressions [Math. 20] to [Math. 22].

When $\vec{m}_{1,1}-\vec{m}_{2,2}=(m_1',\ldots,m_m')$ and $\vec{m}_3=\vec{y}_1-\vec{y}_3=(m_{3,1},\ldots,m_{3,m})$, $\alpha_j=H(vid_1\|j,seed_3), v'=\Sigma_{j=1}^{m}\alpha_j m_j'$, and $v_3=\Sigma_{j=1}^{m}\alpha_j m_{3,j}$  [Math. 20]

When $\vec{m}_{2,2}-\vec{m}_{1,3}=(m_1',\ldots,m_m')$ and $\vec{m}_4=(m_{4,1},\ldots,m_{4,m})$, $\alpha_j=H(vid_1\|j,seed_1), v'=\Sigma_{j=1}^{m}\alpha_j m_j'$, and $v_4=\Sigma_{j=1}^{m}\alpha_j m_{4,j}$  [Math. 21]

When $\vec{m}_{1,1}-\vec{m}_{2,2}=(m_1',\ldots,m_m')$ and $\vec{m}_3=\vec{y}_1-\vec{y}_3=(m_{3,1},\ldots,m_{3,m})$, $\alpha_j=H(vid_1\|j,seed_3), v'=\Sigma_{j=1}^{m}\alpha_j m_j'$, and $v_3=\Sigma_{j=1}^{m}\alpha_j m_{3,j}$  [Math. 22]

As described above, according to the third example embodiment, the verification (fraud detection) can be performed without using hash functions.

While example embodiments of the present invention have thus been described, the present invention is not limited thereto. Further variations, substitutions, or adjustments can be made without departing from the basic technical concept of the present invention. For example, the configurations of the networks, the configurations of the elements, and the representation modes of the data illustrated in the drawings have been used only as examples to facilitate understanding of the present invention. That is, the present invention is not limited to the configurations illustrated in the drawings.

Figure 17:
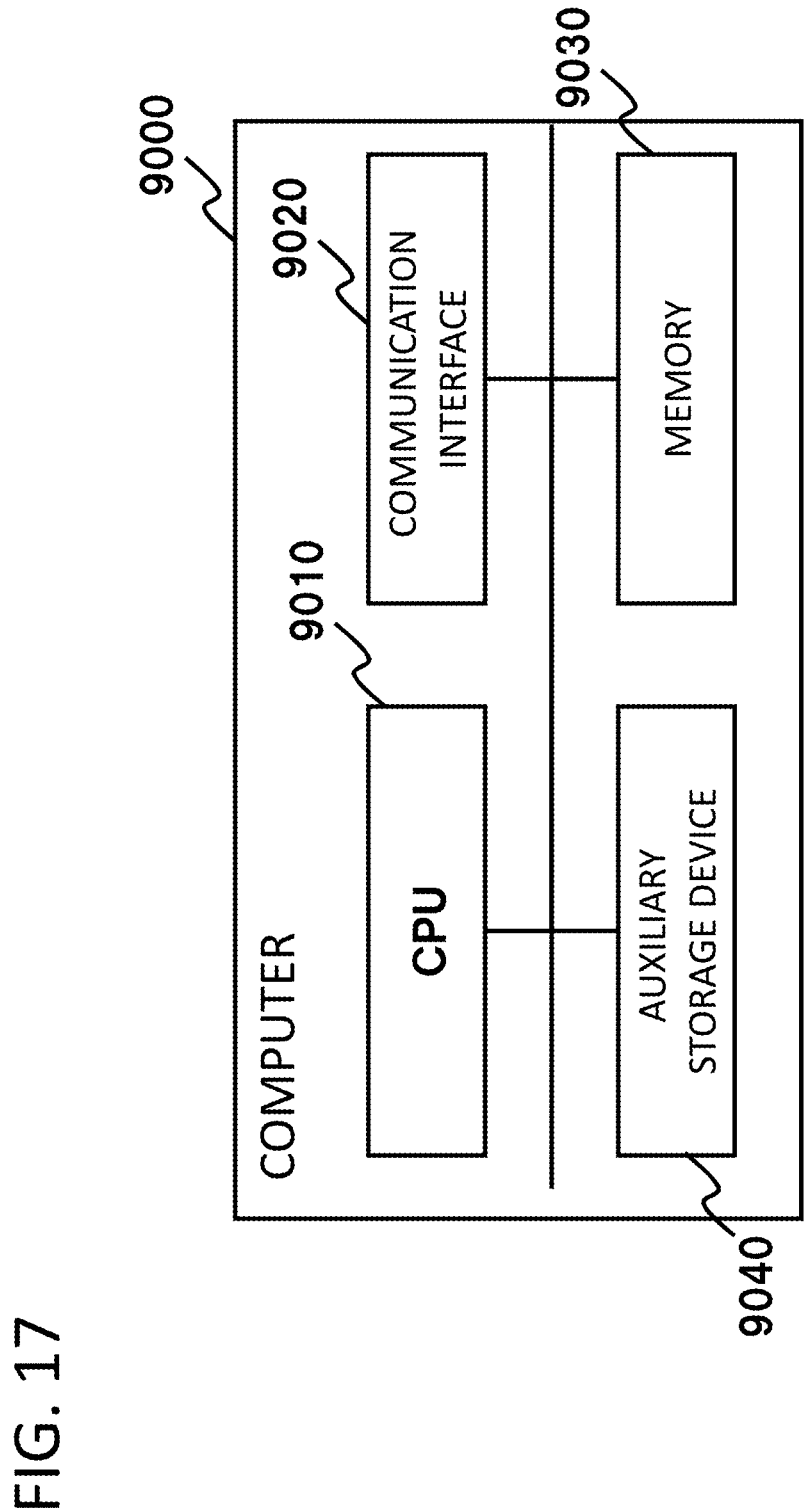
FIG. 17 is a diagram illustrating a configuration of a computer that constitutes a secure computation server according to the present invention.

Each of the procedures described in the above first to third example embodiments can be realized by a program that causes a computer (9000 in FIG. 17) which functions as a corresponding one of the secure computation nodes and the secure computation servers P to realize the function as the corresponding apparatus. This computer includes, for example, a CPU (Central Processing Unit) 9010, a communication interface 9020, a memory 9030, and an auxiliary storage device 9040 in FIG. 17. That is, the CPU 9010 in FIG. 17 performs the random number generation program and the permutation processing program and performs processing for updating various calculation parameters stored in the auxiliary storage device 9040, etc.

That is, the individual parts (processing means, functions) of the secure computation servers $P_i$ according to the above first to third example embodiments can each be realized by a computer program that causes a processor mounted on the corresponding apparatus to use corresponding hardware and execute the corresponding processing as described above.

Finally, suitable modes of the present invention will be summarized.

[Mode 1]
(See the shuffle system according to the above first aspect)

[Mode 2]
In the above shuffle system, the receiving node may determine whether the mini-shuffle is valid by using the data received from the verifying node. If the receiving node determines that the mini-shuffle is not valid, the receiving node may be configured to abort performing the processes.

[Mode 3]
In the above shuffle system, the four secure computation nodes may be configured to include:
  a first secure computation node that holds three seeds ($seed_1$, $seed_2$, and $seed_4$) and shares ($x_1$ and $x_2$) of secret information x in a secret-shared form;
  a second secure computation node that holds three seeds ($seed_2$, $seed_3$, and $seed_4$) and shares ($x_2$ and $x_3$) of the secret information x in a secret-shared form;
  a third secure computation node that holds three seeds ($seed_3$, $seed_1$, and $seed_4$) and shares ($x_3$ and $x_1$) of the secret information x in a secret-shared form; and
  a fourth secure computation node that holds three seeds ($seed_1$, $seed_2$, and $seed_3$) and shares ($x_1-x_2$ and $x_2-x_3$) of the secret information x in a secret-share form.

The resharing nodes and the verifying node may be configured to generate two random values by using a seed(s) that the receiving node does not know.

the resharing nodes may be configured to transmit a result, which is obtained by applying a combination of the random values to the share(s) held therein, as the result(s) of the mini-shuffle, to the receiving node.

The verifying node may be configured to compute a sum or a difference of the results transmitted from the two resharing nodes to the receiving node and transmit the computed result to the receiving node.

[Mode 4]

In the above shuffle system, a mini-shuffle in which the fourth secure computation node operates as a receiving node and a mini-shuffle in which the first secure computation node operates as a receiving node may be configured to be performed in parallel, and a mini-shuffle in which the second secure computation node operates as a receiving node and a mini-shuffle in which the third secure computation node operates as a receiving node may be configured to be performed in parallel.

[Mode 5]

(See the shuffle method according to the above second aspect)

[Mode 6]

(See the program according to the above third aspect)

The above modes 5 and 6 can be expanded in the same manner as mode 1 is expanded to modes 2 to 4.

The disclosure of each of the above PTLs and NPLs is incorporated herein by reference thereto and may be used as the basis or a part of the present invention, as needed. Modifications and adjustments of the example embodiments and examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been concretely disclosed. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

INDUSTRIAL APPLICABILITY

The present invention is applicable not only to a shuffle system but also to a secret-sharing system in which sorting processing using a shuffle function of a shuffle system is performed.

REFERENCE SIGNS LIST

10-1 to 10-4 secure computation node
101 permutation generation part
102 permutation application part
103 arithmetic operation part
104 fraud detection part
105 random value computation part
106 hash value computation part
107 seed storage part
108 share value storage part
9000 computer
9010 CPU
9020 communication interface
9030 memory
9040 auxiliary storage device
$P_1$ to $P_4$ secure computation server

What is claimed is:

1. A shuffle system for shuffling shares, wherein the shuffle system comprises four secret computation nodes networked to each other, and wherein each of the four secret computation nodes comprises at least one memory storing instructions and at least one processor configured to execute the instructions the shuffle system is configured to:
perform a round including processes of:
selecting one of the four secure computation nodes as a receiving node; and
causing two of three remaining secure computation nodes among the four secure computation nodes to operate as resharing nodes and a remaining secure computation node to operate as a verifying node; and
repeat the round so that each of the four computation nodes is selected as the receiving node at least once,
wherein each of the four secret computation nodes has permutations known only to three of the four secret computation nodes for all combinations of three of the four secret computation nodes,
wherein, in the round, the resharing nodes perform a mini-shuffle for resharing the shares held therein by using a permutation that the receiving node does not know and transmits a result of the mini-shuffle to the receiving node, and
wherein, in the round, the verifying node computes data to verify the result of the mini-shuffle performed by the resharing nodes by using the permutation that the receiving node does not know and transmits the data to the receiving node.

2. The shuffle system according to claim 1,
wherein the receiving node determines whether the mini-shuffle is valid by using the data received from the verifying node; and
wherein, if the receiving node determines that the mini-shuffle is not valid, the receiving node aborts performing the processes.

3. The shuffle system according to claim 2,
wherein the four secure computation nodes include:
a first secure computation node that holds three seeds ($seed_1$, $seed_2$, and $seed_4$) and shares ($x_1$ and $x_2$) of secret information x in a secret-shared form;
a second secure computation node that holds three seeds ($seed_2$, $seed_3$, and $seed_4$) and shares ($x_2$ and $x_3$) of the secret information x in a secret-shared form;
a third secure computation node that holds three seeds ($seed_3$, $seed_1$, and $seed_4$) and shares ($x_3$ and $x_1$) of the secret information x in a secret-shared form; and
a fourth secure computation node that holds three seeds ($seed_1$, $seed_2$, and $seed_3$) and shares ($x_1-x_2$ and $x_2-x_3$) of the secret information x in a secret-share form,
wherein the resharing nodes and the verifying node generate two random values by using a seed that the receiving node does not know,
wherein the resharing nodes transmit a result, which is obtained by applying a combination of the random values to the shares held therein, as the result of the mini-shuffle, to the receiving node, and
wherein the verifying node computes a sum or a difference of the results transmitted from the two resharing nodes to the receiving node and transmits a computed result to the receiving node.

4. The shuffle system according to claim 3,
wherein a mini-shuffle in which the fourth secure computation node operates as a receiving node and a mini-shuffle in which the first secure computation node operates as a receiving node are performed in parallel, and
wherein a mini-shuffle in which the second secure computation node operates as a receiving node and a mini-shuffle in which the third secure computation node operates as a receiving node are performed in parallel.

5. The shuffle system according to claim 1,
wherein the four secure computation nodes include:
a first secure computation node that holds three seeds ($seed_1$, $seed_2$, and $seed_4$) and shares ($x_1$ and $x_2$) of secret information x in a secret-shared form;
a second secure computation node that holds three seeds ($seed_2$, $seed_3$, and $seed_4$) and shares ($x_2$ and $x_3$) of the secret information x in a secret-shared form;
a third secure computation node that holds three seeds ($seed_3$, $seed_1$, and $seed_4$) and shares ($x_3$ and $x_1$) of the secret information x in a secret-shared form; and
a fourth secure computation node that holds three seeds ($seed_1$, $seed_2$, and $seed_3$) and shares ($x_1$-$x_2$ and $x_2$-$x_3$) of the secret information x in a secret-share form,
wherein the resharing nodes and the verifying node generate two random values by using a seed that the receiving node does not know,
wherein the resharing nodes transmit a result, which is obtained by applying a combination of the random values to the shares held therein, as the result of the mini-shuffle, to the receiving node, and
wherein the verifying node computes a sum or a difference of the results transmitted from the two resharing nodes to the receiving node and transmits a computed result to the receiving node.

6. The shuffle system according to claim 5,
wherein a mini-shuffle in which the fourth secure computation node operates as a receiving node and a mini-shuffle in which the first secure computation node operates as a receiving node are performed in parallel, and
wherein a mini-shuffle in which the second secure computation node operates as a receiving node and a mini-shuffle in which the third secure computation node operates as a receiving node are performed in parallel.

7. A shuffle method for shuffling shares performed in a shuffle system comprising four secret computation nodes network to each other, the shuffle method comprising:
repeatedly performing a round so that each of the four secure computation nodes is selected as a receiving node at least once;
wherein the round includes:
selecting one of the four secure computation nodes as a receiving node; and
causing two of three remaining secure computation nodes among the four secure computation nodes to operate as resharing nodes and a remaining secure computation node to operate as a verifying node,
wherein each of the four secret computation nodes has permutations known only to three of the four secret computation nodes for all combinations of three of the four secret computation nodes,
wherein, in the round, the resharing nodes perform a mini-shuffle for resharing the shares held therein by using a permutation that the receiving node does not know and transmits a result of the mini-shuffle to the receiving node, and
wherein, in the round, the verifying node computes data to verify the result of the mini-shuffle performed by the resharing nodes by using the permutation that the receiving node does not know and transmits the data to the receiving node.

8. The shuffle method according to claim 7,
wherein the receiving node determines whether the mini-shuffle is valid by using the data received from the verifying node; and
wherein, if the receiving node determines that the mini-shuffle is not valid, the receiving node aborts processing.

9. The shuffle method according to claim 8,
wherein the four secure computation nodes include:
a first secure computation node that holds three seeds ($seed_1$, $seed_2$, and $seed_4$) and shares ($x_1$ and $x_2$) of secret information x in a secret-shared form;
a second secure computation node that holds three seeds ($seed_2$, $seed_3$, and $seed_4$) and shares ($x_2$ and $x_3$) of the secret information x in a secret-shared form;
a third secure computation node that holds three seeds ($seed_3$, $seed_1$, and $seed_4$) and shares ($x_3$ and $x_1$) of the secret information x in a secret-shared form; and
a fourth secure computation node that holds three seeds ($seed_1$, $seed_2$, and $seed_3$) and shares ($x_1$-$x_2$ and $x_2$-$x_3$) of the secret information x in a secret-share form,
wherein the resharing nodes and the verifying node generate two random values by using a seed that the receiving node does not know,
wherein the resharing nodes transmit a result, which is obtained by applying a combination of the random values to the shares held therein, as the result of the mini-shuffle, to the receiving node, and
wherein the verifying node computes a sum or a difference of the results transmitted from the two resharing nodes to the receiving node and transmits a computed result to the receiving node.

10. The shuffle method according to claim 9,
wherein a mini-shuffle in which the fourth secure computation node operates as a receiving node and a mini-shuffle in which the first secure computation node operates as a receiving node are performed in parallel, and
wherein a mini-shuffle in which the second secure computation node operates as a receiving node and a mini-shuffle in which the third secure computation node operates as a receiving node are performed in parallel.

11. The shuffle method according to claim 7,
wherein the four secure computation nodes include:
a first secure computation node that holds three seeds ($seed_1$, $seed_2$, and $seed_4$) and shares ($x_1$ and $x_2$) of secret information x in a secret-shared form;
a second secure computation node that holds three seeds ($seed_2$, $seed_3$, and $seed_4$) and shares ($x_2$ and $x_3$) of the secret information x in a secret-shared form;
a third secure computation node that holds three seeds ($seed_3$, $seed_1$, and $seed_4$) and shares ($x_3$ and $x_1$) of the secret information x in a secret-shared form; and
a fourth secure computation node that holds three seeds ($seed_1$, $seed_2$, and $seed_3$) and shares ($x_1$-$x_2$ and $x_2$-$x_3$) of the secret information x in a secret-share form, wherein the resharing nodes and the verifying node generate two random values by using a seed that the receiving node does not know, wherein the resharing nodes transmit a result, which is obtained by applying a combination of the random values to the shares held therein, as the result of the mini-shuffle, to the receiving node, and wherein the verifying node computes a sum or a difference of the results transmitted from the two resharing nodes to the receiving node and transmits a computed result to the receiving node.

12. The shuffle method according to claim 11, wherein a mini-shuffle in which the fourth secure computation node operates as a receiving node and a mini-shuffle in which the first secure computation node operates as a receiving node are performed in parallel, and wherein a mini-shuffle in which the second secure computation node operates as a receiving node and a mini-shuffle in which the third secure computation node operates as a receiving node are performed in parallel.

13. A non-transitory computer-readable medium storing a program for causing each of four secure computation nodes to execute a process of repeatedly performing a round so that each of the four secure computation nodes is selected as a receiving node at least once, wherein the round includes:
selecting one of the four secure computation nodes as a receiving node, and
causing two of three remaining secure computation nodes among the four secure computation nodes to operate as resharing nodes and a remaining secure computation node to operate as a verifying node, wherein each of the four secret computation nodes has permutations known only to three of the four secret computation nodes for all combinations of three of the four secret computation nodes, wherein, in the round, the resharing nodes perform a mini-shuffle for resharing the shares held therein by using a permutation that the receiving node does not know and transmits a result of the mini-shuffle to the receiving node, and wherein, in the round, the verifying node computes data to verify the result of the mini-shuffle performed by the resharing nodes by using the permutation that the receiving node does not know and transmits the data to the receiving node.

14. The non-transitory computer-readable medium according to claim 13, wherein the receiving node determines whether the mini-shuffle is valid by using the data received from the verifying node; and wherein, if the receiving node determines that the mini-shuffle is not valid, the receiving node aborts processing.

15. The non-transitory computer-readable medium according to claim 14, wherein the four secure computation nodes include:
a first secure computation node that holds three seeds ($seed_1$, $seed_2$, and $seed_4$) and shares ($x_1$ and $x_2$) of secret information x in a secret-shared form;
a second secure computation node that holds three seeds ($seed_2$, $seed_3$, and $seed_4$) and shares ($x_2$ and $x_3$) of the secret information x in a secret-shared form;
a third secure computation node that holds three seeds ($seed_3$, $seed_1$, and $seed_4$) and shares ($x_3$ and $x_1$) of the secret information x in a secret-shared form; and
a fourth secure computation node that holds three seeds ($seed_1$, $seed_2$, and $seed_3$) and shares ($x_1$-$x_2$ and $x_2$-$x_3$) of the secret information x in a secret-share form, wherein the resharing nodes and the verifying node generate two random values by using a seed that the receiving node does not know, wherein the resharing nodes transmit a result, which is obtained by applying a combination of the random values to the shares held therein, as the result of the mini-shuffle, to the receiving node, and wherein the verifying node computes a sum or a difference of the results transmitted from the two resharing nodes to the receiving node and transmits a computed result to the receiving node.

16. The non-transitory computer-readable medium according to claim 15, wherein a mini-shuffle in which the fourth secure computation node operates as a receiving node and a mini-shuffle in which the first secure computation node operates as a receiving node are performed in parallel, and wherein a mini-shuffle in which the second secure computation node operates as a receiving node and a mini-shuffle in which the third secure computation node operates as a receiving node are performed in parallel.

17. The non-transitory computer-readable medium according to claim 13, wherein the four secure computation nodes include:
a first secure computation node that holds three seeds ($seed_1$, $seed_2$, and $seed_4$) and shares ($x_1$ and $x_2$) of secret information x in a secret-shared form;
a second secure computation node that holds three seeds ($seed_2$, $seed_3$, and $seed_4$) and shares ($x_2$ and $x_3$) of the secret information x in a secret-shared form;
a third secure computation node that holds three seeds ($seed_3$, $seed_1$, and $seed_4$) and shares ($x_3$ and $x_1$) of the secret information x in a secret-shared form; and
a fourth secure computation node that holds three seeds ($seed_1$, $seed_2$, and $seed_3$) and shares ($x_1$-$x_2$ and $x_2$-$x_3$) of the secret information x in a secret-share form, wherein the resharing nodes and the verifying node generate two random values by using a seed that the receiving node does not know, wherein the resharing nodes transmit a result, which is obtained by applying a combination of the random values to the shares held therein, as the result of the mini-shuffle, to the receiving node, and wherein the verifying node computes a sum or a difference of the results transmitted from the two resharing nodes to the receiving node and transmits a computed result to the receiving node.

18. The non-transitory computer-readable medium according to claim 17, wherein a mini-shuffle in which the fourth secure computation node operates as a receiving node and a mini-shuffle in which the first secure computation node operates as a receiving node are performed in parallel, and wherein a mini-shuffle in which the second secure computation node operates as a receiving node and a mini-shuffle in which the third secure computation node operates as a receiving node are performed in parallel.

* * * * *